(12) United States Patent
Fujita et al.

(10) Patent No.: US 8,144,621 B2
(45) Date of Patent: Mar. 27, 2012

(54) NODE, ROUTING CONTROL METHOD, AND ROUTING CONTROL PROGRAM

(75) Inventors: Norihito Fujita, Tokyo (JP); Masahiro Jibiki, Tokyo (JP)

(73) Assignee: NEC Corporation, Tokyo (JP)

( * ) Notice: Subject to any disclaimer, the term of this patent is extended or adjusted under 35 U.S.C. 154(b) by 530 days.

(21) Appl. No.: 12/171,346

(22) Filed: Jul. 11, 2008

(65) Prior Publication Data

US 2009/0180489 A1 Jul. 16, 2009

(30) Foreign Application Priority Data

Jan. 11, 2008 (JP) ................................. 2008-004913

(51) Int. Cl.
*H04L 12/28* (2006.01)
*H04L 12/56* (2006.01)

(52) U.S. Cl. ..................... 370/254; 370/395.32; 370/408

(58) Field of Classification Search ........................ None
See application file for complete search history.

(56) References Cited

U.S. PATENT DOCUMENTS

| | | | |
|---|---|---|---|
| 7,428,220 B1 * | 9/2008 | Caronni et al. ............... | 370/254 |
| 2005/0015511 A1 * | 1/2005 | Izmailov et al. .............. | 709/238 |
| 2005/0076137 A1 * | 4/2005 | Tang et al. ..................... | 709/238 |
| 2005/0187946 A1 * | 8/2005 | Zhang et al. ................... | 707/100 |
| 2005/0243740 A1 * | 11/2005 | Chen et al. ..................... | 370/256 |
| 2007/0079004 A1 * | 4/2007 | Tatemura et al. ............. | 709/238 |
| 2007/0121570 A1 * | 5/2007 | Takeda et al. ................. | 370/348 |
| 2008/0107043 A1 * | 5/2008 | Smith et al. ................... | 370/255 |
| 2008/0130516 A1 * | 6/2008 | You et al. ....................... | 370/254 |
| 2008/0144644 A1 * | 6/2008 | Allan et al. .................... | 370/401 |
| 2008/0198850 A1 * | 8/2008 | Cooper et al. ................. | 370/392 |
| 2008/0273474 A1 * | 11/2008 | Yanagihara .................... | 370/256 |
| 2008/0304493 A1 * | 12/2008 | Marr et al. ..................... | 370/400 |
| 2008/0310302 A1 * | 12/2008 | Detwiler et al. .............. | 370/230 |
| 2009/0006593 A1 * | 1/2009 | Cortes ........................... | 709/223 |
| 2010/0061385 A1 * | 3/2010 | Welin et al. .................... | 370/401 |
| 2010/0110935 A1 * | 5/2010 | Tamassia et al. .............. | 370/256 |

OTHER PUBLICATIONS

T. Clausen, P. Jacquet, "Optimized Link State Routing Protocol (OLSR)", RFC3626, Oct. 2003.

Ion Stoica, Robert Morris, David Karger, M. Frans Kaashoek, and Hari Balakrishnan, "Chord: A Scalable Peer-to-peer Lookup Service for Internet Applications", ACM SIGCOMM 2001, San Diego, CA, Aug. 2001, pp. 149-160.

A. Rowstron and P. Druschel, Pastry: Scalable, distributed object location and routing for large-scale peer-to-peer systems, IFIP/ACM International Conference on Distributed Systems Platforms (Middleware), Heidelberg, Germany, pp. 329-350, Nov. 2001 (continute to p. 2).

B. Zhou, A Joseph, J. Kubiatowicz, "Tapestry: A Resilient Global Scale Overlay for Service Deployment", IEEE JSAC, Jan. 2004.

(Continued)

*Primary Examiner* — Chirag Shah
*Assistant Examiner* — Suk Jin Kang
(74) *Attorney, Agent, or Firm* — Young & Thompson

(57) ABSTRACT

Disclosed is a node that includes a distributed hash table generation means that generates a distributed hash table which indicates the next node to which a message is to be transferred, using a link state routing protocol, a link state information that exchange unit sends and receives link state information, and a tree delivery control unit that determines the transfer destination of the link state information so that the link state information is delivered along a tree where the source node of the link state information is a root.

21 Claims, 14 Drawing Sheets

OTHER PUBLICATIONS

Sylvia Ratnasamy, Paul Francis, Mark Handley, Richard Karp, and Scott Shenker, "A Scalable Content-Addressable Network", In Proceedings of ACM SIGCOMM 2001.

Sameh El-Ansary, Luc Onana Alima, Per Brand and Seif Haridi, Efficient Broadcast in Structured P2P Networks, The 2nd International Workshop on Peer-To-Peer Systems (IPTPS' 03), (Berkeley, CA. USA), Feb. 2003.

Publication of the Invention: "Scalable Qos Routing Schemes for Overlay Networks", IEICE Technical Report (Shingaku Gihou, vol. 107, No. 148), cover page, list of contents, copyright page and pp. 1-6, Jul. 2007.

* cited by examiner

FIG. 2

VIRTUAL NETWORK TOPOLOGY SETTING TABLE 101

| NODE ID | NEIGHBORING NODE BASE IP ADDRESS | VIRTUAL IP ADDRESS | | ALIVE FLAG |
|---|---|---|---|---|
| | | LOCAL SIDE | REMOTE SIDE | |
| A2 | 2.3.4.5 | 10.1.2.1 | 10.1.2.2 | 1 |
| A3 | 3.4.5.6 | 10.1.3.1 | 10.1.3.2 | 0 |
| A4 | 4.5.6.7 | 10.1.4.1 | 10.1.4.2 | 1 |
| A6 | 6.7.8.9 | 10.1.6.1 | 10.1.6.2 | 1 |

VIRTUAL NETWORK TOPOLOGY SETTING TABLE

| NODE ID | NEIGHBORING NODE BASE IP ADDRESS | VIRTUAL IP ADDRESS | | ALIVE FLAG | MODIFICATION FLAG |
|---|---|---|---|---|---|
| | | LOCAL SIDE | REMOTE SIDE | | |
| B2 | 2.3.4.5 | 10.1.2.1 | 10.1.2.2 | 1 | 0 |
| B3 | 3.4.5.6 | 10.1.3.1 | 10.1.3.2 | 1 | 0 |
| B4 | 4.5.6.7 | 10.1.4.1 | 10.1.4.2 | 1 | 1 |

TOPOLOGY POLICY

IF THE VIRTUAL NETWORK IS SEPARATED INTO MULTIPLE SEGMENTS:
THE NODES, EACH HAVING THE SMALLEST ID IN EACH SEGMENT,
SHOULD FORM A VIRTUAL LINK

FIG. 11

103 VIRTUAL NETWORK TOPOLOGY CONFIGURATION TABLE

| NODE ID | NEIGHBORING NODE BASE IP ADDRESS | VIRTUAL IP ADDRESS | |
|---|---|---|---|
| | | LOCAL SIDE | REMOTE SIDE |
| C2 | 2.3.4.5 | 10.1.2.1 | 10.1.2.2 |
| C3 | 3.4.5.6 | 10.1.3.1 | 10.1.3.2 |
| C4 | 4.5.6.7 | 10.1.4.1 | 10.1.4.2 |
| C5 | 5.6.7.8 | 10.1.5.1 | 10.1.5.2 |
| C6 | 6.7.8.9 | 10.1.6.1 | 10.1.6.2 |

NODE, ROUTING CONTROL METHOD, AND ROUTING CONTROL PROGRAM

REFERENCE TO RELATED APPLICATION

This application is based upon and claims the benefit of the priority of Japanese patent application No. 2008-004913, filed on Jan. 11, 2008, the disclosure of which is incorporated herein in its entirety by reference thereto.

FIELD OF THE INVENTION

The present invention relates to a node, a routing control method, and a routing control program in a virtual network, and more particularly to a node, which performs route control using a link state routing protocol in a virtual network configured on a real network such as a VPN (Virtual Private Network) or an overlay network, a routing control method and a routing control program that are applicable to the node.

BACKGROUND OF THE INVENTION

A link state routing protocol is used for a routing control method in a virtual network configured on a real network. The link state routing protocol is used as a routing protocol not only on a virtual network but also on a general wired or wireless network.

The link state routing protocol is widely used as one of standard routing protocols used for route calculation on a computer network. A typical example of the link state routing protocol that is actually used is an OSPF (Open Shortest Path First).

The link state routing protocol shares the link states (link state information) of the nodes, such as neighboring states, with other nodes to get information on the whole network topology for performing the route calculation. The link state information is not only sent periodically but also sent as information for notifying link state updates when the neighboring state is changed. To reliably send the link state information to all other nodes in a situation where the neighboring state is changed and the whole network topology becomes unknown, the message transfer method called flooding is used. Flooding refers to a message transfer method for transferring packets to all neighboring nodes, as if water overflowed, to transfer messages from one node to the next in many directions. This method transfers a packet indiscriminately during a fixed lifetime.

Flooding has an advantage in that link state information is reliably transferred. On the other hand, however, repeated message transfer from one node to the next as described above results in the same node receiving the same message two or more times and this wasteful transfer, in turn, results in wasteful network resource consumption. To solve this problem, various methods are proposed to reduce the amount of traffic caused by the flooding in the link state routing protocol (for example, see non-Patent Document 1). Non-Patent Document 1 discloses a method that uses MPR (Multipoint Relays) in OLSR (Optimized Link State Routing Protocol).

In OLSR, each node sends the Hello message regularly to recognize a set of neighboring nodes in the same way as in a general link state routing protocol. In addition, in OLSR, a set of recognized neighboring nodes is included in the Hello message to advertize it, This allows each node to recognize a set of nodes two hops ahead (2-hop neighboring node set). When the 2-hop neighboring node set is recognized, each node calculates the minimum neighboring node set via a message must pass to reach all 2-hop neighboring nodes. A set of neighboring nodes calculated here is an MPR set. A node selected as an MPR operates in such a way that it transfers only the flooding message notified by a node (MPR selector), which has selected the MPR, and received from the node of the MPR selector.

In OLSR, each node calculates an MPR as described above, and when link state information is flooded to other nodes, only the nodes selected as MPRs transfer the link state information. So, the traffic amount of flooding can be reduced.

As described above, the link state routing protocol uses a method that minimizes the number of nodes that transfer link state information, received via flooding, in order to reduce the traffic amount of control messages.

In a standard link state routing protocol, link state information is exchanged in the topology of a virtual network through which actual user data passes or in a topology created by reducing the topology. Hello messages are also exchanged in the topology of a virtual network through which actual user data passes.

[Non-Patent Document 1] T. Clausen, P. Jacquet, "Optimized Link State Routing Protocol (OLSR)", RFC3626, October 2003.

The entire disclosure of Non-Patent Document 1 is incorporated herein by reference thereto. The following analyses are given by the present inventor.

An attempt to reduce the amount of control messages, which are used in a link state routing protocol, in a virtual network using the method described in non-Patent Document 1 generates a problem that the traffic amount of Hello messages increases. The reason is that the Hello message flows independently through each link because the link to a neighboring node is configured by a point-to-point tunnel in the virtual network. That is, the Hello message is not sent to all neighboring nodes in one broadcast operation as in a wireless network, but must be sent individually to each neighboring node. In a standard link state routing protocol, since Hello messages are exchanged between all neighboring nodes, the traffic amount of Hello messages is proportional to the number of links in the network. In this case, the traffic amount of Hello messages is not negligible in a network where there are many links (for example, in a high link-density network in the full mesh topology). As described above, the problem is that the traffic amount is large.

SUMMARY OF THE DISCLOSURE

Accordingly, it is an object of the present invention to provide a node, a routing control method, and a routing control program that can reduce the traffic amount of control messages and that use a link state routing protocol in a virtual network.

In accordance with an aspect of the present invention, there is provided a node that belongs to a virtual network on a base network and performs routing control of the virtual network according to a link state routing protocol. The node comprises distributed hash table generation means that generates a distributed hash table, which indicates a next node to which a message is to be transferred, using a link state routing protocol; link state information exchange means that sends and receives link state information that includes node information on the node itself and link information on links to neighboring nodes; and tree delivery control means that determines a transfer destination of the link state information so that the link state information is delivered along a tree where a source node of the link state information is a root.

In accordance with another aspect of the present invention, there is provided a route control method that is applicable to a virtual network on a base network and that uses a link state routing protocol. The method comprises:
a) generating a distributed hash table, which indicates a next node to which a message is to be transferred, using a link state routing protocol;
b) determining the transfer destination of link state information so that the link state information is delivered along a tree where the source node of the link state information is a root; and
c) sending and receiving the link state information that includes node information on the node itself and link information on links to neighboring nodes.

In accordance with still another aspect of the present invention, there is provided a routing control program installed in a computer that works as a node that belongs to a virtual network on a base network and performs route control of the virtual network according to a link state routing protocol. The program causes the computer to perform:
a) distributed hash table generation processing that generates a distributed hash table, which indicates a next node to which a message is to be transferred, using a link state routing protocol;
b) link state information exchange processing that sends and receives link state information that includes node information on the node itself and link information on links to neighboring nodes; and
c) tree delivery control processing that determines a transfer destination of the link state information so that the link state information is delivered along a tree where a source node of the link state information is a root.

The meritorious effects of the present invention are summarized as follows.

The present invention determines the transfer destination of link state information so that the link state information is delivered along a tree where the source node of the link state information is the root, thus reducing the traffic amount of the link state information.

Still other features and advantages of the present invention will become readily apparent to those skilled in this art from the following detailed description in conjunction with the accompanying drawings wherein examples of the invention are shown and described, simply by way of illustration of the mode contemplated of carrying out this invention. As will be realized, the invention is capable of other and different examples, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

FIG. 2 is a diagram showing an example of a virtual network topology setting table that is set in the first exemplary embodiment of the present invention.

FIG. 6 is a diagram showing an example of a virtual network topology setting table that is set in the second exemplary embodiment of the present invention.

FIG. 7 is a diagram showing an example of a topology policy that is set in the second exemplary embodiment of the present invention.

FIG. 11 is a diagram showing an example of a virtual network topology setting table that is set in the third exemplary embodiment of the present invention.

PREFERRED MODES OF THE INVENTION

The present invention will be described more in detail with reference to the drawings.

Figure 1:
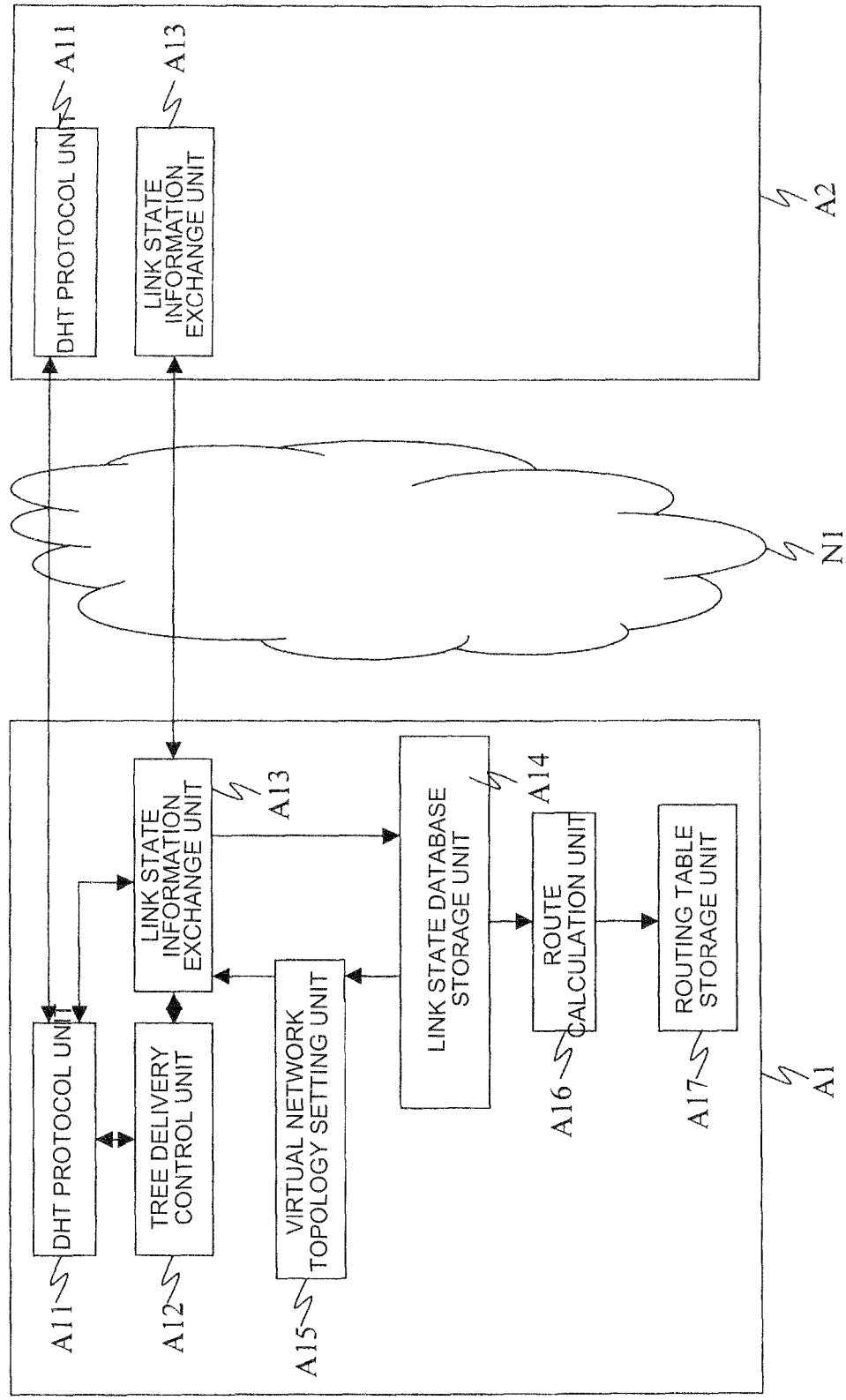
FIG. 1 is a block diagram showing a node in a first exemplary embodiment of the present invention.

FIG. 1 is a block diagram showing nodes in a first exemplary embodiment of the present invention. Nodes A1 and A2 in the first exemplary embodiment of the present invention shown in FIG. 1 are connected via a base network N1. Although two nodes, A1 and A2, are shown in FIG. 1, in the present invention, the number of nodes connected via the base network N1 is not limited two. The nodes A1 and A2, which belong to a virtual network, have the same configuration. So, the following describes the configuration of the node A1 as an example of the node configuration.

A virtual network to which the nodes belong is created on the base network N1.

The node A1 comprises a DHT protocol unit A11, a tree delivery control unit A12, a link state information exchange unit A13, a link state database storage unit A14, a virtual network topology setting unit A15, a route calculation unit A16, and a routing table storage unit A17. Although the node A2 comprises the same components, only the DHT protocol unit A11 and the link state information exchange unit A13 are shown in FIG. 1.

The DHT protocol unit A11 operates according to a protocol for configuring a distributed Hash Table (DHT). The available protocols for configuring a distributed hash table are Chord, Pastry, Tapestry, and CAN, and the DHT protocol unit A11 operates according to any of those protocols. In addition, any protocol other than those protocols may also be used.

Chord is described in Reference 1 given below.

[Reference 1]

Ion Stoica, Robert Morris, David Karger, M. Frans Kaashoek, and Hari Balakrishnan, "Chord: A Scalable Peerto-peer Lookup Service for Internet Applications", ACM SIGCOMM 2001, San Diego, Calif., August 2001, pp. 149-160

Pastry is described in Reference 2 given below.

[Reference 2]

A. Rowstron and P.Druschel, "Pastry: Scalable, distributed object location and routing for large-scale peer-to-peer systems", IFIP/ACM International Conference on Distributed Systems Platforms (Middleware), Heidelberg, Germany, pages 329-350, November, 2001

Tapestry is described in Reference 3 given below.

[Reference 3]

B. Zbou, A. Joseph, J. Kubiatowicz, "Tapestry: A Resilient Global Scale Overlay for Service Deployment", IEEE JSAC, January 2004

CAN is described in Reference 4 given below.

[Reference 4]

Sylvia Ratnasamy, Paul Francis, Mark Handley, Richard Karp, and Scott Shenker, "A Scalable Content-Addressable Network", In Proceedings of ACM SIGCOMM 2001

The DHT protocol unit A11 configures (generates) a distributed bash table based on a key assigned to each node. The key of each node is created by hashing a unique identifier such as the IP address or the host name of each node. The key length is long enough, for example, 128 bits or 160 bits, to ensure that the possibility of key duplication is virtually 0.

The distributed hash table configuration method depends on the protocol type. One of its characteristics is that a structured table, through which all other nodes are reached, can be configured simply by setting the neighboring nodes according to a predetermined rule even if all nodes are not known. Here, "setting the neighboring nodes" means that the next hop nodes, to which a message is to be sent, are determined for sending the message (link state information) to the nodes corresponding to a key range. That is, whichever distributed hash table protocol is used, the DHT protocol unit of each node determines the next nodes to which the message should be transferred according to the key range of the destination node, and thereby, transfers the message to the nodes to which the message should be sent. When a protocol for configuring a distributed hash table (DHT protocol) is not used, the configuration of a table through which all nodes can be reached involves the order of N to the first power for one node when the total number of nodes is N. In contrast, when a DHT protocol is used, the configuration of the table usually requires the order of log N, and therefore, this method is highly scalable. Another major characteristic is that the autonomous distributed table reconfiguration is possible when a node is added or deleted.

The following describes an example of the operation in which the DHT protocol unit A11 operates according to the Chord protocol. That is, the following describes an example of how the DHT protocol unit determines the next hop nodes, to which a message is to be transferred, according to the Chord protocol in order to send the message to the nodes corresponding to a key range. The Chord protocol is a method for configuring the table assuming that the hash space is configured as a ring. When Chord is used, a neighboring node is called a finger. The maximum number of fingers depends on the hash length, and when the hash length is $2^n$ bits long, the maximum number of fingers is n. At this time, the kth finger is represented as finger(k) where $0 \leq k \leq n-1$. The DHT protocol unit A11 whose (node's) key is X selects a node, which has the key value closest to $X+2^k$, as finger(k) from the nodes each having the key equal to or higher than $X+2^k$. And, to send a message to the destination node having the key Y, the DHT protocol unit A11 determines that the message be sent to the finger that has a key equal to or lower than Y and closest to Y. In other words, to send a message to the node that has the key Y satisfying $X\_(k-1)<Y \leq X\_k$, the DHT protocol unit A11 creates an entry finger(k) to which the message is to be transferred. This operation is an example of the generation of a distributed hash table indicating the next node to which a message is to be transferred. In this example, $X\_(k-1)$ is the key of the finger(k-1) and $X\_k$ is the key of the finger(k). The DHT protocol unit of each node repeats this operation recursively (that is, the DHT protocol unit of each node determines fingers), thus allowing the message to reach a destination node having any key.

The DHT protocol unit A11 monitors the state of neighboring nodes (fingers in the case of Chord) managed by the DHT protocol. When the disconnection of a neighboring node from the network is detected, the DHT protocol unit A11 notifies the link state information exchange unit A13 that the node has been disconnected and causes the link state information exchange unit A13 to send the link state information to other nodes to indicate that the node has been disconnected.

The link state information is information including the node information on the node itself and the link information that is the information on the links from the node to the neighboring nodes. The node information is, for example, a node ID (node identifier) identifying the node. The link information is, for example, is information on the IP addresses of neighboring nodes, the costs of the link to the neighboring nodes, and the link quality of the link to the neighboring nodes.

The DHT protocol unit A11 also performs up/down monitoring for the neighboring nodes. That is, the DHT protocol unit A11 checks if a neighboring node is connected to or disconnected from the virtual network. For example, the DHT protocol unit A11 regularly sends the ping packet to the neighboring nodes (fingers in the case of Chord) in the distributed hash table and, if a response is not received continuously the number of times equal to or higher than the threshold, the DHT protocol unit A11 determines that the neighboring node is disconnected from the virtual network and, before it is determined that the node is disconnected from the virtual network, determines that node participates in the virtual network. This determination method is an example of up/down monitoring, and other methods may also be used for up/down monitoring. Note that the Chord protocol performs up/down monitoring only for the fingers.

The tree delivery control unit A12 controls the delivery of link state information based on the distributed hash table, configured by the DHT protocol unit A11, so that the link state information sent by the link state information exchange unit A13 is sent to all other nodes. The tree delivery control unit A12 operates according to the same algorithm not only in the node A1 but also in all other nodes. The tree delivery control unit A12 transfers link state information along the broadcast tree in which the node itself is the root and all other nodes are leaves or nodes. For example, the tree delivery control unit A12 of the node A1 transfers link state information along the broadcast tree in which the node A1, which is the node itself, is the root and all other nodes are leaves or nodes. Delivering link state information in this way along the broadcast tree, in which the node itself is the root, eliminates a wasteful transfer where the same node receives the same message two or more times. Therefore, this configuration minimizes the traffic amount caused by flooding.

As an example of the tree delivery based on the distributed hash table configured by the DHT protocol unit A11, the following describes the Chord Broadcast used in this example. The detailed operation of the Chord Broadcast is described in Reference 5 given below.

[Reference 5]

Samceh El-Ansary, Luc Onana Alima, Per Brand and Seif Haridi, "Efficient Broadcast in Structured P2P Networks", The 2nd International Workshop On Peer-To-Peer Systems (IPTPS'03), (Berkeley, Calif. USA), February 2003

The following describes the message delivery method using the Chord Broadcast. In this example, assume that the node A1 is the source node from which a message is sent. The tree delivery control unit A12 of the node A1 that is the source node determines that the message be sent to all fingers. In this case, the link state information exchange unit A13 of the node A1 inserts Key_(k+1) in the header of the message, which will be sent to finger(k), as the additional information. Note that Key_k is the key of finger(k). The tree delivery control unit A12 of finger(k), which receives the message from the node A1, determines that the received message be sent to all fingers in the key range from Key_k that is the key of finger(k) to the key lower than Key_(k+1). After that, the finger that receives the message recursively performs the same operation to transfer the message. As a result, the same message can be sent to all participating nodes.

The link state information exchange unit A13 sends the link state information, owned by the node itself (node A1 in this example), to other nodes. The link state information exchange unit A13 also receives the link state information sent from other nodes. The link state information is sent and received via the tree delivery control unit A12 and is delivered along the tree to prevent the occurrence of wasteful transfers. That is, the link state information exchange unit A13 sends the link state information to the nodes to which the tree delivery control unit A12 has determined to send the link state information as described above. The link state information exchange unit A13 passes the link state information, received from other nodes, to the link state database storage unit A14. In addition, when the link state information on the node itself is sent, the link state information exchange unit A13 includes only the neighboring nodes, whose alive flag is 1 in the virtual network topology setting unit A15, into the link state information. Furthermore, when the information indicating that a node has disconnected is received from the DHT protocol unit A11, the link state information exchange unit A13 sends the link state information for flashing the link state information sent by that node. In other words, the link state information exchange unit A13 sends the link state information indicating the disconnection of the node. For example, to flash the link state information, the link state information exchange unit A13 re-sends the elapsed time of the link state information, sent by the node, as MaxAge. In response to the link state information including the MaxAge elapsed time, a node immediately flashes the link state information (link state information sent by the disconnected node).

The link state database storage unit A14 has the function to accumulate the link state information on all nodes on the virtual network, including that on the node itself, collected by the link state information exchange unit A13 so that a list of connected nodes and the link connection status can be recognized. For example, the link state database storage unit A14 lists the node IDs of the nodes from which the link state information is sent for recognizing the list of connected nodes. In addition, the link state database storage unit A14 recognizes the link connection information using the list of nodes and the information on the links from each node to the neighboring nodes advertised in the link state information.

Furthermore, the link state database storage unit A14 passes the list of the recognized nodes to the virtual network topology setting unit A15.

The virtual network topology setting unit A15 has the information indicating with which nodes the node itself (node A1 in this example) has a virtual link to those nodes as neighboring nodes in the virtual network to which the node itself (node A1 in this example) belongs. The information indicating with which nodes the node itself has a virtual link is stored in a table called a virtual network topology setting table.

FIG. 2 is a diagram showing an example of a virtual network topology setting table that is set by the virtual network topology setting unit A15. In the example in FIG. 2, four neighboring nodes with the node IDs of A2, A3, A4, and A6 are set in a virtual network topology setting table 101. Note that the node IDs stored in the virtual network topology setting table are defined separately from the IDs identifying the nodes in the distributed hash table (DHT). In the example shown in FIG. 2, the IP addresses of the neighboring nodes are "2.3.4.5", "3.4.5.6", "4.5.6.7", and "6.7.8.9". In addition, for the neighboring node with the base IP address of "2.3.4.5", a tunnel is set up to configure the virtual link and its virtual IP address of the local side (that is, on the node A1 side) is "10.1.2.1" and that of the remote side (on the neighboring node side) is "10.1.2.2". Similarly, virtual IP addresses are set for the other three neighboring nodes.

In the virtual network topology setting table, the alive flag is set for each neighboring node. The virtual network topology setting unit A15 sets 1 for a node recognized by the link state database storage unit A14 as connected, and 0 for a node not recognized as connected.

The link state information exchange unit A13 advertizes only the information on neighboring nodes, whose alive flag is 1 in the virtual network topology setting unit A15, as link state information. By doing so, a virtual link is established only with neighboring nodes, which are currently online, as neighboring nodes and, in this way, the virtual network topology is configured. That is, the virtual network topology is configured excluding offline nodes.

The route calculation unit A16 uses the link state information, recognized by the link state database storage unit A14, to calculate the next hop or the whole route for reaching the nodes in the virtual network and registers the calculated result in the routing table storage unit A17 as route entries. As a result of this operation, a route in the virtual network can be controlled according to the link state routing protocol. The route calculation unit A16 generally uses the Dijkstra algorithm, which is used by the link state routing protocol, as the route calculation algorithm. The route calculation unit A16 calculates the route to a destination, for example, according to the Dijkstra algorithm. The route calculation unit A16 performs route calculation when there is a change in the link state information recognized by the link state database storage unit A14.

The routing table storage unit A17 stores a routing table. The routing table is a table in which the route entries calculated by the route calculation unit A16 are registered. The routing table stored in the routing table storage unit A17 may include only the IP address of the next hop node corresponding to a destination IP address. The routing table may also store the IP addresses of the hops on the route (that is, whole route).

Figure 3:
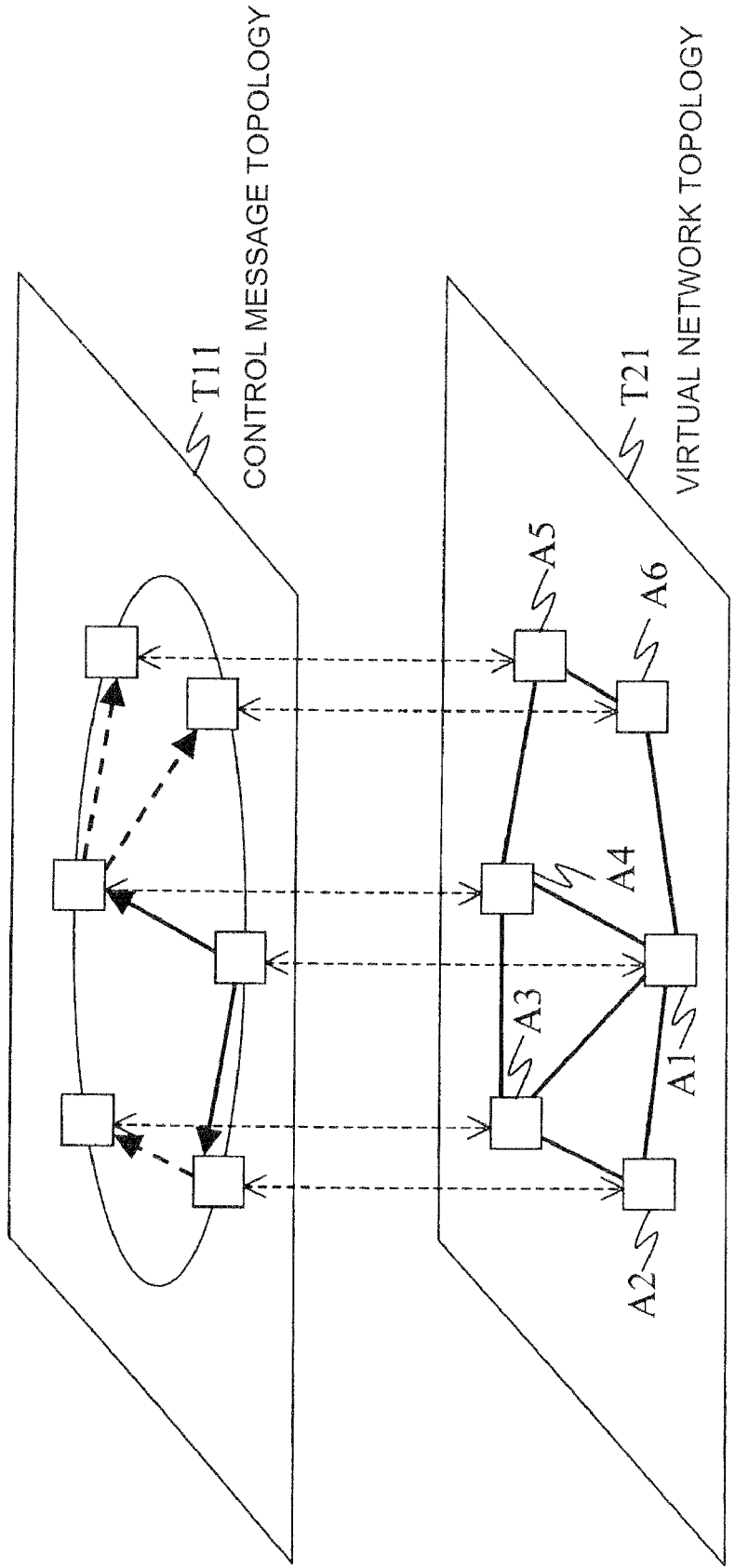
FIG. 3 is a diagram showing the relation between the control message topology and the virtual network topology in the first exemplary embodiment of the present invention.

FIG. 3 is a diagram showing an example of the relation between the control message topology and the virtual network topology in the first exemplary embodiment of the present invention Referring to FIG. 3, the following describes the relation between the control message topology which is the result of link state information exchange carried out in this example by the link state information exchange unit A13 via the tree delivery control unit A12 and the virtual network topology for which route calculation is performed by the route calculation unit A16.

In the example shown in FIG. 3, the nodes A1 to A6 are connected to the virtual network. A control message topology T11 shown in FIG. 3 is a logical topology for delivering the link state information in a tree-like manner based on the distributed hash table configured by the DHT protocol unit A11. The arrows shown in the control message topology T11 indicate the delivery route of the link state information sent from the node A1 that is the source. When the node A1 is the source of the link state information as shown in FIG. 3, a tree-like topology is created in which the node A1 is the top (root) from which the other nodes A2-A6 are reached. A virtual network topology T21 is configured as a result of the link state information exchange that is carried out using the control message topology T11. The virtual network topology T21 is the virtual network topology through which actual user data is transferred.

According to the present invention, the link state information is exchanged, not in the virtual network topology T21, but in the control message topology T11. The node according to the present invention need not exchange the Hello messages on all links in the virtual network topology T21.

The Hello message used in the general link state routing protocol is replaced by the up/down monitoring mechanism installed in the DHT protocol unit A11, in the present invention.

In this exemplary embodiment, the virtual network topology setting table such as the one shown in FIG. 2 is set in advance in each node, and the link state information is sent along the broadcast tree with the node itself as the root. In response to the received link state information, each node updates the alive flag of the virtual network topology setting table for modifying the virtual network.

Figure 4:
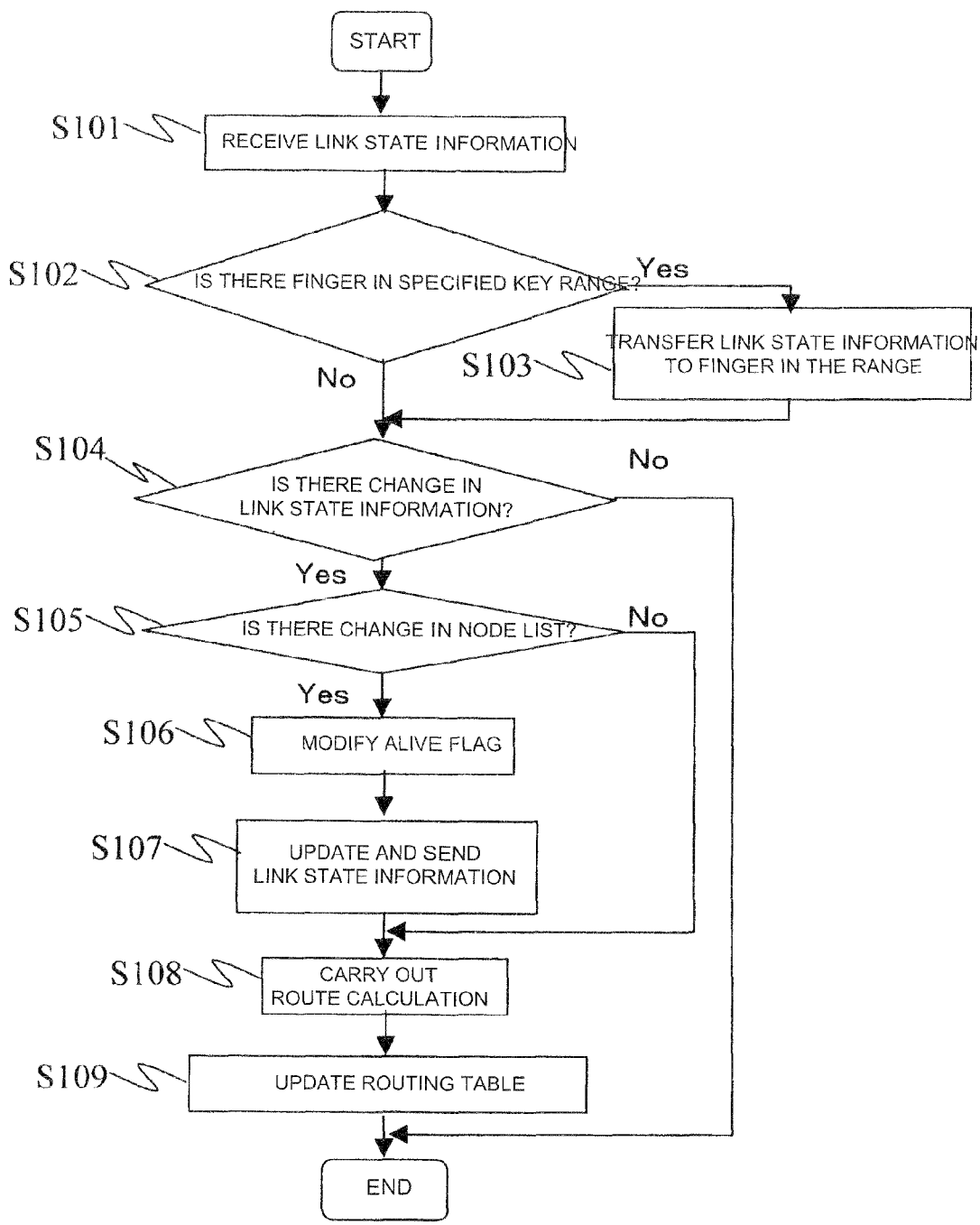
FIG. 4 is a flowchart showing an example of the operation of the node in the first exemplary embodiment of the present invention.

The following describes the operation of the first exemplary embodiment. FIG. 4 is a flowchart showing the operation performed when the node in the first exemplary embodiment of the present invention receives link state information. The operation will be described with the node A1 as the example.

First, the link state information exchange unit A13 of the node A1 receives link state information from a neighboring node (step S01). After that, the link state information exchange unit A13 references the header of the received link state information and causes the tree delivery control unit A12 to determine if there is a finger having a key ranging from the DHT key of the node itself to the key included in the header as the information (step S102). The tree delivery control unit A12 determines if there is a finger corresponding to a key in the range from the key of the node itself to the key included in the header of the received link state information.

If the tree delivery control unit A12 determines that there is a finger in the range (Yes in step S102), the link state information exchange unit A13 copies the received link state information and transfers the copy to all the corresponding fingers (step S103). That is, the copy of the link state information is sent to all fingers each corresponding to a key in the range described above. At this time, the link state information exchange unit A13 includes Key_(k+1) in the header of the link state information as the key. As described above, Key_k means the key of finger(k). This means that the link state information exchange unit A13 sends the link state information whose header includes the key of an immediate forward finger of the node A1 that is the node itself.

After the processing in step S103 or if the tree delivery control unit A12 determines that there is no finger in the range described above (No in step S102), the link state information exchange unit A13 passes the link state information, which was received in step S101, to the link state database storage unit A14. The link state database storage unit A14 references the link state information received in step S101 and compares it with the link state information received previously to determine if there is a change in the link state information (step S104).

If it is determined in step S104 that there is a change in the link state information, the link state database storage unit A14 determines if the list of nodes recognized from the link state information has changed from the list of nodes recognized previously (step S105). Note that the list of nodes is managed in the link state database storage unit A14.

If it is found in step S105 that there is a change in the list of nodes, the link state database storage unit A14 checks the difference between the list of nodes and the alive flags of the entries of the neighboring node settings that are set in the virtual network topology setting unit A15. If there is a change between them, the link state database storage unit A14 causes the virtual network topology setting unit A15 to modify the alive flags in the neighboring nodes that are set (step S106).

A specific example of the detailed processing in step S106 is as follows. For example, assume that the virtual network topology setting table 101 shown in FIG. 2 is set in the virtual network topology setting unit A15 and that the link state information received in step A101 indicates that the node A3 is added. In this case, the link state database storage unit A14 causes the virtual network topology setting unit A15 to change the alive flag of the node A3 from 0 to 1. If the received link state information indicates that the node A4 is erased, the link state database storage unit A14 causes the virtual network topology setting unit A15 to change the alive flag of the node A4 from 1 to 0.

After the virtual network topology setting unit A15 changes the setting in step S106, the virtual network topology setting unit A15 updates the link state information based on the change. This link state information is the link state information on the node itself. That is, the virtual network topology setting unit A15 updates the node information on the node itself and the link information on the links between the node itself and the neighboring nodes. The virtual network topology setting unit A15 passes the updated link state information to the link state information exchange unit A13 to pass it to other nodes (step S107). In step S107, the link state information exchange unit A13 acquires the finger information on the node A1 via the tree delivery control unit A12 and sends the link state information to the fingers.

After the processing in step S107 or if it is determined in step S105 that there is no change in the list of nodes, the route calculation unit A16 carries out the route calculation based on the new link state information (step S108) and, based on the calculation result, updates the routing table storage unit A17 (step S109).

If it is determined in step S104 that there is no change in the link state information, the processing is terminated without performing the route calculation and the routing table update. That is, the processing is terminated without performing step S105 and the subsequent steps.

The operation performed in this example when the link state information is received by the node A1 has been described.

Although the processing performed when Chord is used by the DHT protocol unit A11 has been described, the processing is applicable also when a DHT protocol other than Chord is used. Whether or not the protocol is a selectable DHT protocol depends on whether the tree delivery is possible in the protocol.

The following describes a DHT protocol that uses the Plaxton algorithm, such as Tapestry or Pastry, as an example of a case in which a DHT protocol other than Chord is used. In the description below, assume that the key of a node is a 4-digit hexadecimal number, that is, b=4 and l=4. b is the base of the digits of a key and is 16(=$2^4$) in the case of a hexadecimal number and, so, b=4. l is the number of digits of a key. The link state information exchange unit A13 of the source node (node A1 in this case) sends a message to all neighboring nodes based on the Plaxton algorithm. In this case, the link state information exchange unit A13 inserts the destination key, corresponding to the neighboring node, in the message header as the additional information. For example, assume that the key of the sending node is 1A7D and that the message is sent to the neighboring node with the key of 1E29 that is a route entry corresponding to the destination key of 1E** (* indicates an arbitrary digit). In this case, 1E that is the destination key of the route entry is included in the header as the additional information. A node that receives this message transfers the message to a neighboring node in the range where the key range is further narrowed, based on the additional information included in the header. In this case, the destination key corresponding to the neighboring node is inserted similarly in the message header as the additional information. For example, if the key of the node itself is 1E29 and 1E is included in the header of the received message as the additional information, the received message is transferred to the neighboring node of the route entry corresponding to the destination key where the  part of 1E (low-order 8 bits) is further narrowed (for example, the destination keys 1E1*, 1E2*, etc.). The same message can be sent to all participating nodes by recursively repeating the above operation.

Although the DHT protocol unit A11 uses a structured DHT protocol, such as Chord and Pastry, in this example described above, other non-structured P2P(Peer-to-Peer) protocols such as Gnutella may also be used.

Next, the following describes the effect of this example.

In this example, based on the distributed hash table configured by the DHT protocol unit A11 in an autonomous and distributed manner, the tree delivery control unit A12 controls the sending of the link state information, which is sent by the link state information exchange unit A13, so that it reaches all other nodes. Doing so prevents a wasteful transfer, which is the problem with the flooding because the same node receives the same message two or more times, and minimizes the amount of traffic generated by the flooding. That is, the traffic amount of the link state information can be reduced.

Although the Hello message is exchanged in the virtual network topology when a general link state routing protocol is used, the exchange of the Hello message is replaced in this example by the mechanism of monitoring up/down status for nodes in the DHT protocol unit A11. That is, instead of exchanging the Hello messages, the DHT protocol unit A11 monitors the tip/down of neighboring nodes. Because a DHT protocol requires that the up/down monitoring be performed only for neighboring nodes (fingers in the case of Chord) based on the DHT protocol, the traffic amount is not proportional to the number of links in the virtual network topology and so, even in a virtual network where there are many links such as a full-mesh topology, the traffic amount of up/down monitoring for nodes can be kept to a fixed amount.

Figure 5:
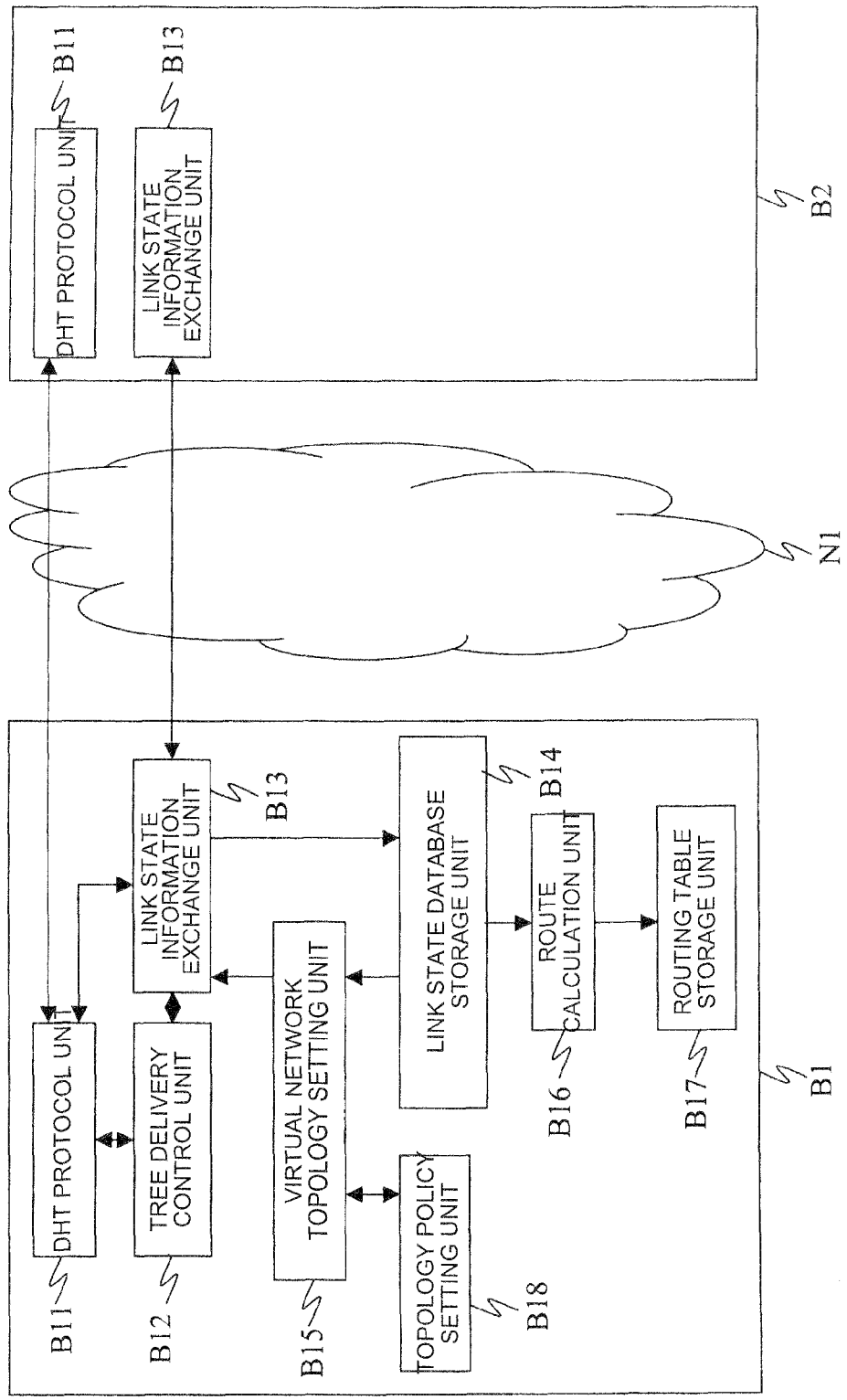
FIG. 5 is a block diagram showing a node in a second exemplary embodiment of the present invention.

FIG. 5 is a block diagram showing a node in a second exemplary embodiment of the present invention. Nodes B1 and B2 in the second exemplary embodiment of the present invention shown in FIG. 5 are connected via a base network N1. As with the first exemplary embodiment, the number of nodes connected to the base network N1 is not limited two. The nodes B1 and B2, which belong to a virtual network, have the same configuration. So, the following describes the configuration of the node B1 as an example of the node configuration.

Referring to FIG. 5, the node B1 comprises a DHT protocol unit B11, a tree delivery control unit B12, a link state information exchange unit B13, a link state database storage unit B14, a virtual network topology setting unit B15, a route calculation unit B16, a routing table storage unit B17, and a topology policy setting unit B18. Of those components, the DHT protocol unit B11, tree delivery control unit B12, link state information exchange unit B13, route calculation unit B16, and routing table storage unit B17 are components corresponding to the DHT protocol unit A11, tree delivery control unit A12, link state information exchange unit A13, route calculation unit A16, and routing table storage unit A17 in the node A1 in the first exemplary embodiment (see FIG. 1) and, so, their description is omitted. The link state database storage unit B14 also corresponds to the link state database storage unit A14 in the node A1 in the first exemplary embodiment. Although the node B2 comprises the same components as those in the node B1, only the DHT protocol unit B11 and the link state information exchange unit B13 are shown in the figure.

As with the link state database storage unit A14 shown in FIG. 1, the link state database storage unit B14 has the function to accumulate the link state information on all nodes in the virtual network, including that on the node itself, collected by the link state information exchange unit B13 so that the information on the connected nodes and the link information (that is, topology of the virtual network) can be recognized. The link state database storage unit B14 passes the recognized node information and the link information to the virtual network topology setting unit B15.

The virtual network topology setting unit B15 has the function equivalent to that of the virtual network topology setting unit A15 in the first exemplary embodiment (see FIG. 1) and, in addition, performs the following processing. The virtual network topology setting unit B15 determines if the node information and the link information on the virtual network, received from the link state database storage unit B14, match a topology policy stored in the topology policy setting unit B18. If the node information and the link information do not match the topology policy, the virtual network topology setting unit B15 modifies the topology of the virtual network. The topology policy refers to a guideline for the topology of the virtual network, in other words, the information indicating the setting that should be set according to the status of the virtual network.

FIG. 6 is a diagram showing an example of a virtual network topology setting table that is set in the virtual network topology setting unit B15 in the second exemplary embodiment. In the example shown in FIG. 6, a virtual network topology setting table 102 in this example includes a node ID, the base IP address of a neighboring node, the virtual IP addresses of the local side and the remote side, and an alive flag as with the virtual network topology setting table 101 in the first exemplary embodiment (see FIG. 2). In addition to those items, the virtual network topology setting table 102 in the second exemplary embodiment further includes a modification flag.

The modification flag is a flag indicating whether the node has been modified because it does not match the topology policy. The initial value (0 in this example) is set in the modification flag of a neighboring node entry that is set in advance. For an entry that has been modified by the virtual network topology setting unit B15 because the node does not match the topology policy that is set in the topology policy setting unit B18, the value indicating that the node has been modified is set (1 in this example). The example shown in FIG. 6 indicates that the entry of the node B4, which is one of neighboring nodes, is the entry of a newly created neighboring node.

The topology policy setting unit B18 stores a topology policy (a guideline for the topology of the virtual network to which the node itself belongs). The virtual network topology setting unit B15 references the topology policy stored in the topology policy setting unit B18. The virtual network topology setting unit B15 determines whether the topology of the virtual network, indicated by the node information and the link information, matches the topology policy of the virtual network.

FIG. 7 shows an example of a topology policy stored in the topology policy setting unit B18. A topology policy 201 shown in FIG. 7 indicates the operation that should be performed when the virtual network is separated into multiple segments. More specifically, the topology policy 201 indicates the operation that the nodes, each having the smallest ID in the segment, should form a virtual network if the virtual network is separated into multiple segments. This topology policy prevents the virtual network from being separated into multiple segments.

Figure 8:
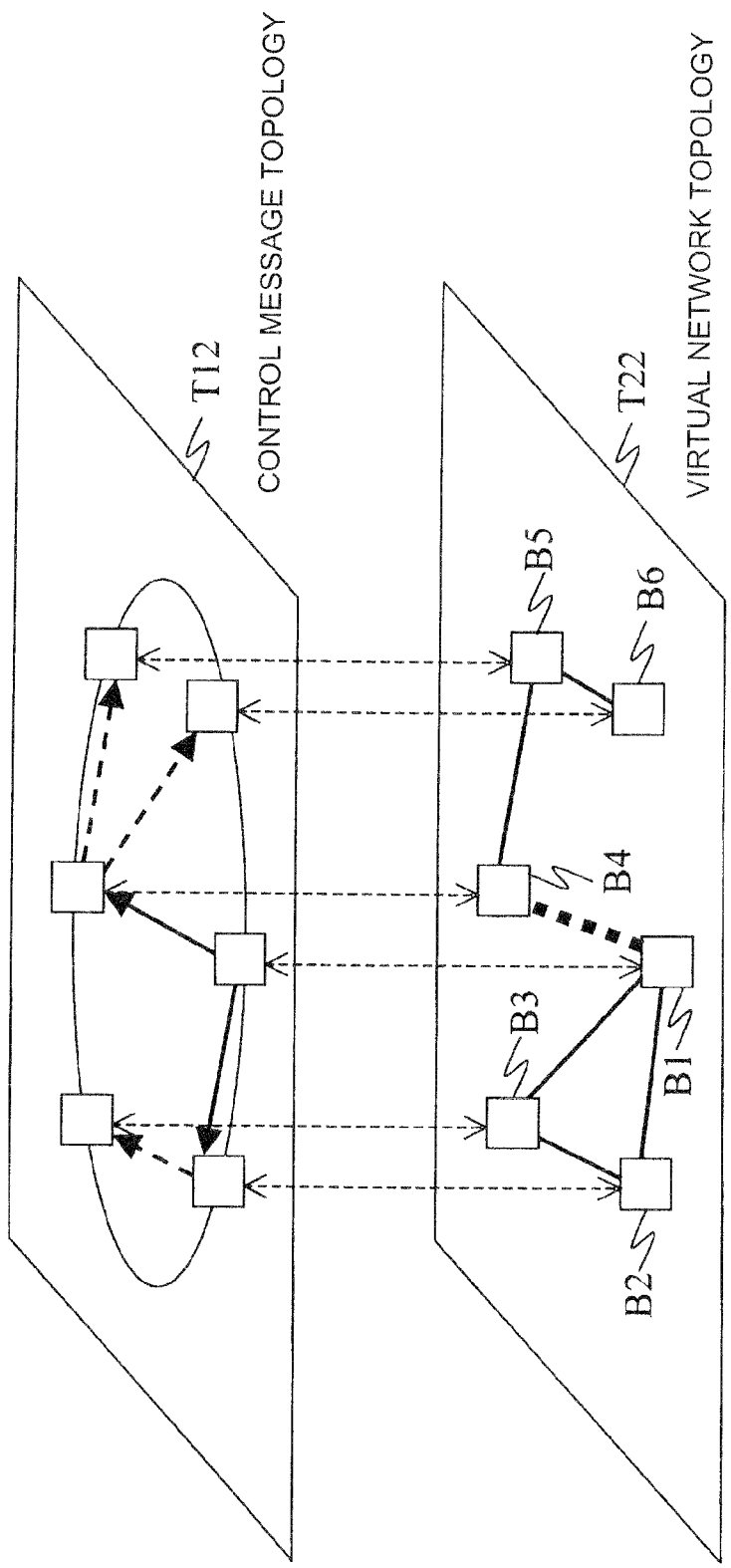
FIG. 8 is a diagram showing an example of the relation between the control message topology and the virtual network topology in the second exemplary embodiment of the present invention.

FIG. 8 is a diagram illustrating an example of the relation between the control message topology and the virtual network topology. The following describes an example of topology modification with reference to FIG. 8. Assume that the node information and the link information recognized by the link state database storage unit B14 indicate that the virtual network is separated into two segments, a segment composed of nodes B1-B3 and a segment composed of nodes B4-B6. That is, as shown in a virtual network topology T22 shown in FIG. 8, the nodes B1-B3 belong to one segment of the virtual network and the nodes B4-B6 belong to the other segment of the virtual network. When the virtual network topology setting unit B15 modifies the topology according to the topology policy, the result is that a link connecting the node B1 and the node B4, each of which has the smallest node ID in the segment, is configured. In this example, the virtual network topology setting unit B15 of the node B1 adds the node B4 to the virtual network topology setting table, and the virtual network topology setting unit B15 of the node B4 adds the node B1 to the virtual network topology setting table.

Although the topology policy describes that the virtual network should not be separated into multiple segments in the example of the topology policy, the description content of the topology policy is not limited to the one shown in this example. For example, the policy describing that a virtual link should always be configured for two or more nodes or the policy describing that the number of virtual links in each node be equal to or smaller than a fixed number may also be set. The virtual network topology setting unit B15 may modify the topology not only by adding a neighboring node but also by deleting a neighboring node.

Figure 9:
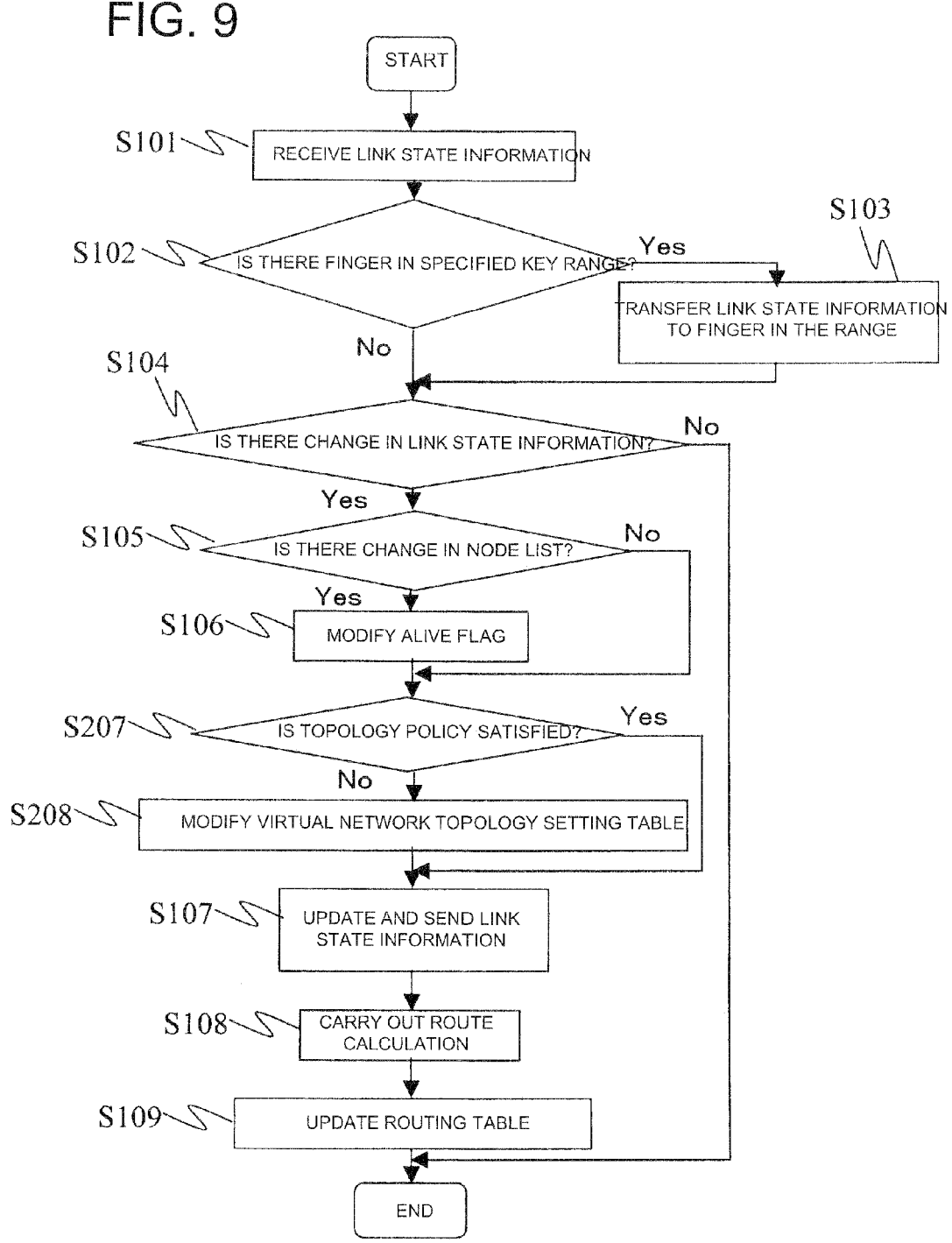
FIG. 9 is a flowchart showing an example of the operation of the node in the second exemplary embodiment of the present invention.

Next, the following describes the operation. FIG. 9 is a flowchart showing an example of the operation that is performed when the node in the second exemplary embodiment of the present invention receives link state information. The operation of node B1 will be described as an example.

Note that processing steps similar to those in the first exemplary embodiment are provided with the same reference numerals as those in FIG. 4, and the description will be omitted. That is, the operations of steps S101-S106 and steps S107-S109 shown in FIG. 9 are the same as those in the first exemplary embodiment (see FIG. 4).

In this example, the virtual network topology setting unit B15 checks, after step S106, if the node information and the link information on the virtual network received from the link state database storage unit B14 matches the topology policy stored in the topology policy setting unit B18 (step S207).

If it is determined that the node information and the link information matches the topology policy (Yes in step S207), step S107 and the subsequent steps are executed.

If it is determined that the node information and the link information do not match the topology policy (No in step S207), the virtual network topology setting unit B15 modifies the virtual network topology setting table stored in the virtual network topology setting unit B15 (step S208). That is, the virtual network topology setting unit B15 modifies the content of the virtual network topology setting table so that the setting content of the virtual network topology setting table matches the topology policy. For example, if a node satisfying a specific condition sets or deletes a virtual link, the virtual network topology setting unit B15 of the node satisfying the condition adds the neighboring node to, or delete the neighboring node from, the virtual network topology setting table. The example shown in FIG. 8 shows a case in which the nodes B1 and B4, each of which satisfies the condition "a node with a small node ID", add a neighboring node. The virtual network topology setting unit B15 sets the modification flag of the entry of the neighboring node, which has been added or deleted by the modification, to the value ("1") to indicate that the modification has been made.

After step S208, step S107 and the subsequent steps are executed.

Next, the following describes the effect of this example. The second exemplary embodiment also gives the same effect as that of the first exemplary embodiment. In addition, in the second exemplary embodiment, the virtual network topology setting unit B15 checks if the topology of the virtual network, configured based on the link state information exchanged by the link state information exchange unit B13, matches the topology policy stored in the topology policy setting unit B18. If the virtual network does not match the topology policy, the virtual network topology setting unit B15 adds or deletes a neighboring node to modify the topology. If such an operation reduces the optimality of the topology, for example, because of the addition or disconnection of nodes or the addition or deletion of links and, as a result, the virtual network is separated into multiple segments, the topology can be modified according to the topology policy that is set in advance. That is, even if the topology of the virtual network is changed by the addition and disconnection of nodes, the topology of the virtual network can be optimized.

Figure 10:
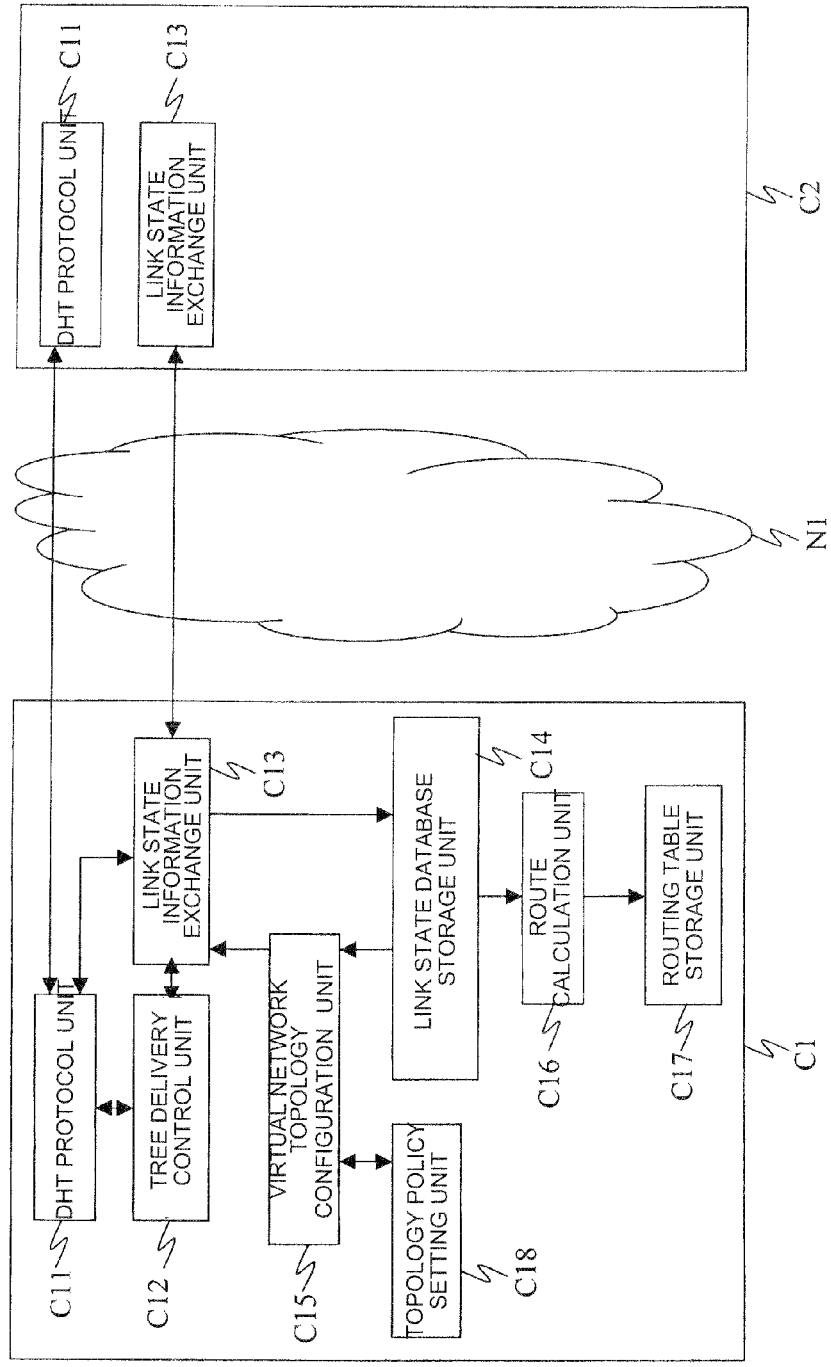
FIG. 10 is a block diagram showing a node in a third exemplary embodiment of the present invention.

FIG. 10 is a block diagram showing a node in a third exemplary embodiment of the present invention. Nodes C1 and C2 in the third exemplary embodiment of the present invention shown in FIG. 10 are connected via a base network N1. As with the examples described above, the number of nodes connected to the base network N1 is not limited two. The nodes C1 and C2, which belong to a virtual network, have the same configuration. So, the following describes the configuration of the node C1 as an example of the node configuration.

The node C1 comprises a DHT protocol unit C1, a tree delivery control unit C12, a link state information exchange unit C13, a link state database storage unit C14, a virtual network topology configuration unit C15, a route calculation unit C16, a routing table storage unit C17, and a topology policy setting unit C18. Of those components, the DHT protocol unit C11, tree delivery control unit C12, link state information exchange unit C13, link state database storage unit C14, route calculation unit C16, and routing table storage unit C17 are components corresponding to the DHT protocol unit A11, tree delivery control unit A12, link state information exchange unit A13, link state database storage unit A14, route calculation unit A16, and routing table storage unit A17 in the node A1 in the first exemplary embodiment (see FIG. 1) and, so, their description is omitted.

The virtual network topology configuration unit C15 sets neighboring nodes based on a list of nodes passed from the link state database storage unit C14 and a topology policy stored in the topology policy setting unit C18 so that the topology of the virtual network satisfies the topology policy. The topology policy in this example is information specifying the configuration mode of the virtual network. The available configuration modes of the virtual network are a full-mesh topology, a ring topology, a star topology, and a tree topology. The topology policy in this example is information specifying any of those configuration modes. The virtual network topology configuration unit C15 sets the neighboring nodes so that the topology of the virtual network satisfies the topology policy, thus automatically configuring the topology of the virtual network.

For example, assume that the topology policy setting unit C18 stores "full-mesh topology" as the virtual network policy. In this case, the virtual network topology configuration unit C15 sets all other nodes, recognized by the link state database storage unit C14, as neighboring nodes. That is, the virtual network topology configuration unit C15 sets the virtual network topology configuration table with those nodes as neighboring nodes. FIG. 11 is a diagram showing an example of the virtual network topology configuration table that is set by the virtual network topology configuration unit C15. If the topology policy setting unit C18 stores "full-mesh topology" as the topology policy, the virtual network topology configuration unit C15 of the node with the node ID of C1 sets the entries of neighboring nodes, corresponding to all nodes other than the node itself (node C1), in the virtual network topology configuration table as shown in a virtual network topology configuration table 103 in FIG. 11. In this case, it is assumed that the node C1 recognizes nodes C2-C6 other than the node itself.

In another example, assume that the topology policy setting unit C18 stores "ring topology" as the virtual network policy. In this case, the virtual network topology configuration unit C15 sets a link to each of the two nodes having the node IDs next to the node ID of the node itself (that is, the virtual network topology configuration unit C15 sets up the virtual network topology configuration table with those two nodes as the neighboring nodes). More specifically, out of the nodes recognized by the link state database storage unit C14, the virtual network topology configuration unit C15 sets a virtual link to the node which has the smallest node ID among those nodes having node IDs larger than the node ID of the node itself. Similarly, the virtual network topology configuration unit C15 sets a virtual link to the node which has the largest node ID among those nodes having node IDs smaller than the node ID of the node itself.

In still another example, assume that the topology policy setting unit C18 stores "star topology" as the virtual network policy. The star topology is a topology in which each node on a network is connected directly to a central, specific node in a radial pattern. In this case, the virtual network topology configuration unit C15 of the central, specific pattern sets links to all other nodes recognized by the link state database storage unit C14 (the virtual network topology configuration table is set up with those nodes as neighboring nodes). The virtual network topology configuration unit C15 of each of the nodes other than the central, specific node sets a link to the specific node (the virtual network topology configuration table is set up with the specific node as the neighboring node).

In yet another example, assume that the topology policy setting unit C18 stores "tree topology" as the virtual network policy. The tree topology is a topology in which one specific node is at the top and other nodes are connected as hierarchically-branched nodes. In this case, out of the nodes recognized by the link state database storage unit C14, the virtual network topology configuration unit C15 sets a link to the nodes hierarchically higher than, and hierarchically lower than, the node itself. That is, the virtual network topology configuration table is set up with the hierarchically higher node and hierarchically lower nodes as the neighboring nodes.

The specific, central node in the star topology and the specific node at the top in the tree topology should be determined in advance. A node having the largest or smallest node ID (or IP address) may also be used as the specific node.

The topology policy setting unit C18 stores the topology configuration guideline (topology policy) of a virtual network automatically configured by the virtual network topology configuration unit C15. In other words, the topology policy setting unit C18 stores a predetermined topology policy. An example of the topology policy is a full-mesh topology, a ring topology, a star topology, and a tree topology. As described above, when a full-mesh topology is set, the neighboring nodes are set so that a virtual link is set for all other nodes recognized by the link state database storage unit C14. When a ring topology is set, the neighboring nodes are set so that, out of the other nodes recognized by the link state database storage unit C14, a virtual link is set for the nodes having node IDs next to that of the node itself (that is, the node which has the smallest ID among those nodes having IDs larger than the ID of the node itself and the node which has the largest ID among those nodes having IDs smaller than the ID of the node itself).

Figure 12:
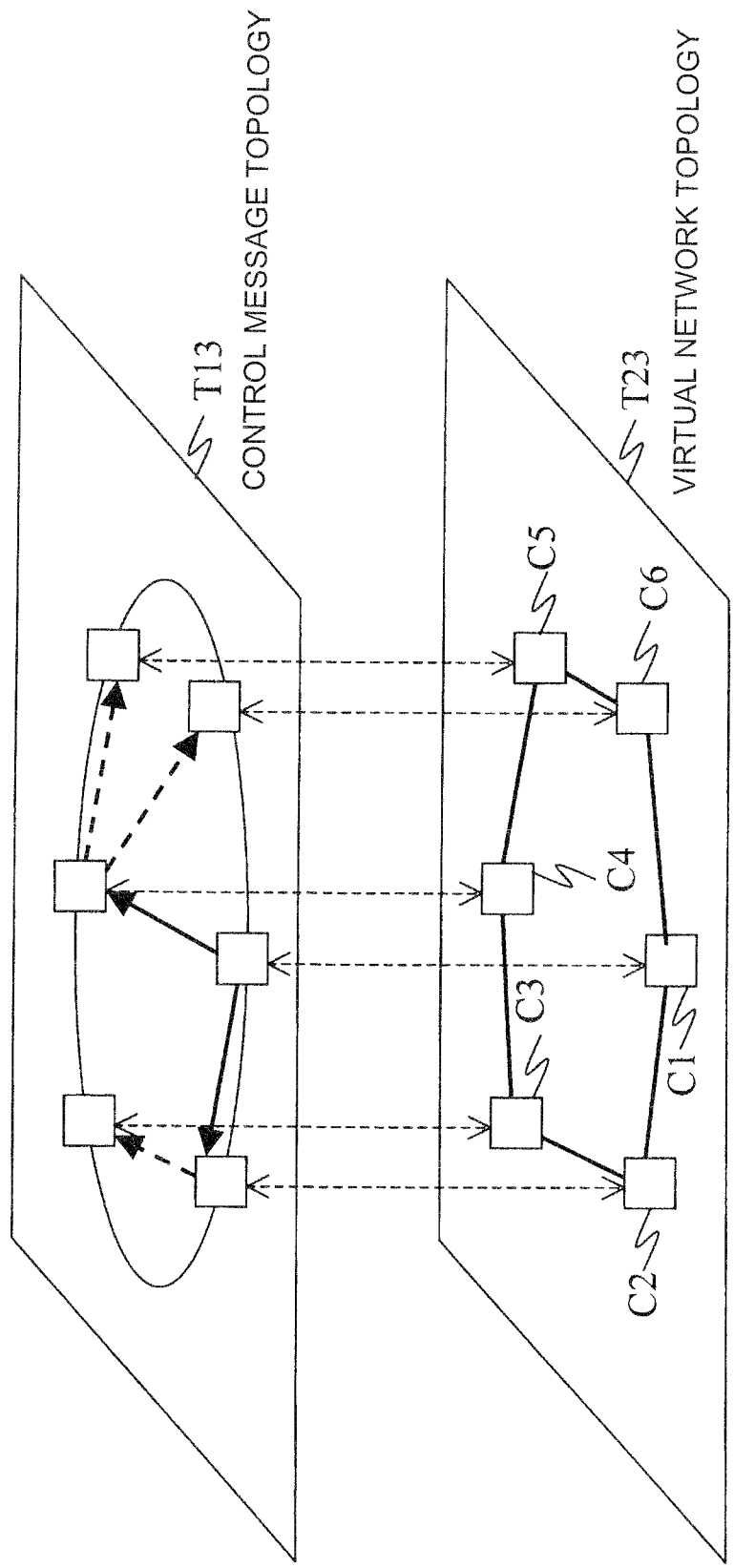
FIG. 12 is a diagram showing an example of the relation between the control message topology and the virtual network topology in the third exemplary embodiment of the present invention.

FIG. 12 is a diagram showing an example of the relation between the control message topology and the virtual network topology in the third exemplary embodiment. The example shown in FIG. 12 shows the relation between the control message topology and the virtual network topology when the ring topology is configured as the virtual network topology. If the topology policy setting unit C18 of the nodes C1-C6 stores "ring topology", the virtual network topology configuration unit C15 of each node sets the neighboring nodes according to the topology policy. As a result, the ring topology is configured in the sequence of node IDs as shown in a virtual network topology T23 shown in FIG. 12.

Figure 13:
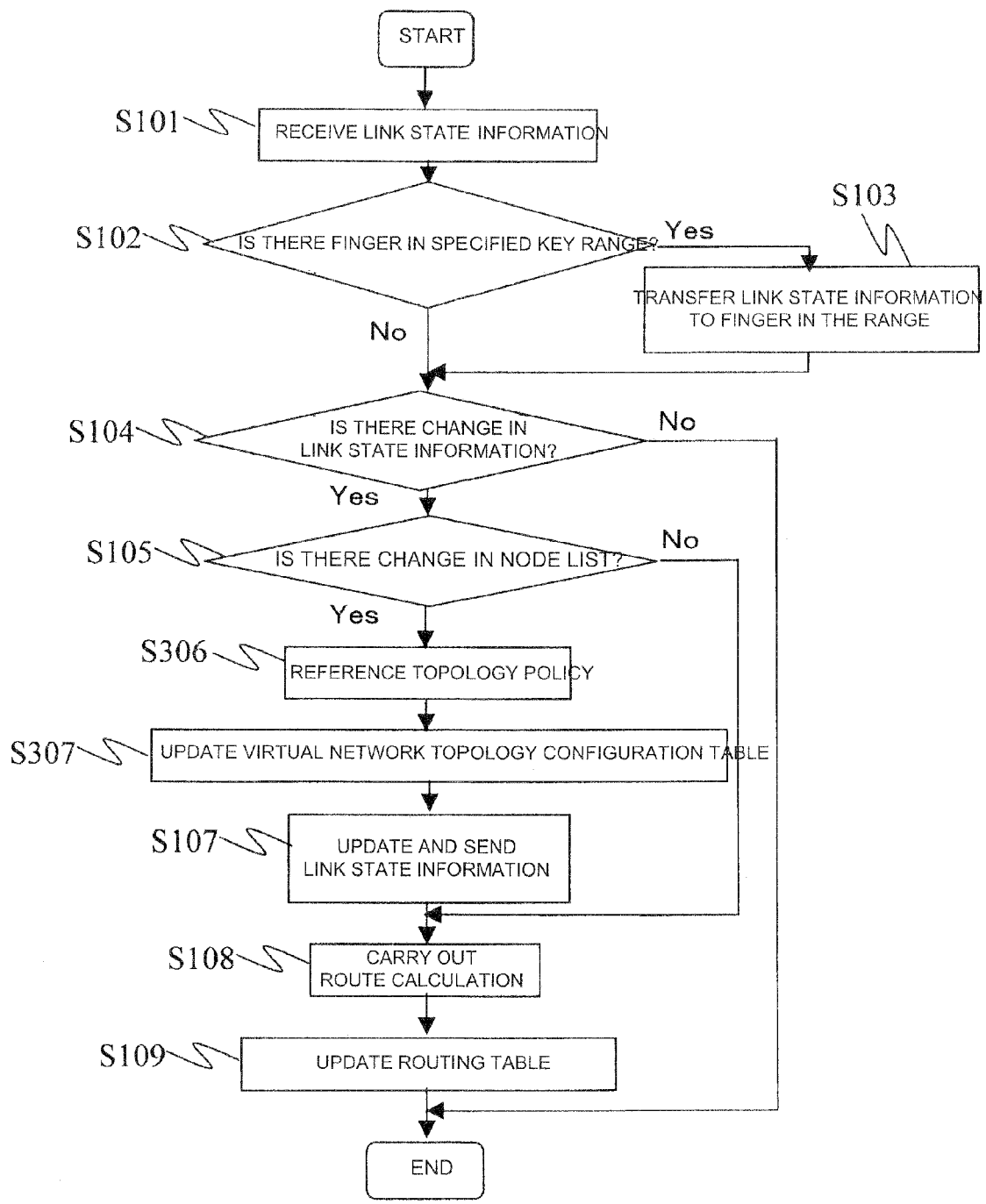
FIG. 13 is a flowchart showing an example of the operation of the node in the third exemplary embodiment of the present invention.

The following describes the operation. FIG. 13 is a flowchart showing an example of the operation that is performed when the node in the third exemplary embodiment of the present invention receives link state information. The operation of node C1 will be described as an example.

Note that processing steps similar to those in the first exemplary embodiment are provided with the same reference numerals as those in FIG. 4, and the description will be omitted. That is, the operations of steps S101-S105 and steps S107-S109 shown in FIG. 13 are the same as those in the first exemplary embodiment (see FIG. 4).

In this example, if it is determined in step S105 that there is a change in the list of nodes (Yes in step S105), the virtual network topology configuration unit C15 references the topology policy stored in the topology policy setting unit C18 (step S306). In other words, the virtual network topology configuration unit C15 references the topology policy setting unit C18 to check the policy for the arrangement of the topology to be automatically configured.

Next, the virtual network topology configuration unit C15 updates the virtual network topology configuration table so that it fits the referenced topology (step S307). For example, assume that the topology policy indicating the full-mesh topology is set in the topology policy setting unit C18. Also assume that the addition of a node is detected in step S105. In this case, the virtual network topology configuration unit C15 adds a neighboring node setting entry for configuring a virtual link for the detected node to the virtual network topology configuration table. Similarly, if the disconnection of a node is detected, the virtual network topology configuration unit C15 deletes the neighboring node setting entry for the detected node from the virtual network topology configuration table.

After step S307, steps S107-S109 are executed, for example, to send link state information based on the updated virtual network topology configuration table.

Next, the following describes the effect of this example.

This example gives the same effect as that of the first exemplary embodiment. In addition, the virtual network topology configuration unit C15 sets the neighboring nodes according to the topology policy stored in the topology policy setting unit C18 based on the list of nodes recognized by the link state database storage unit C14. This operation allows the topology to be re-configured automatically according to the pre-set topology policy even if a node is added or disconnected, thus optimizing the virtual network topology.

Figure 14:
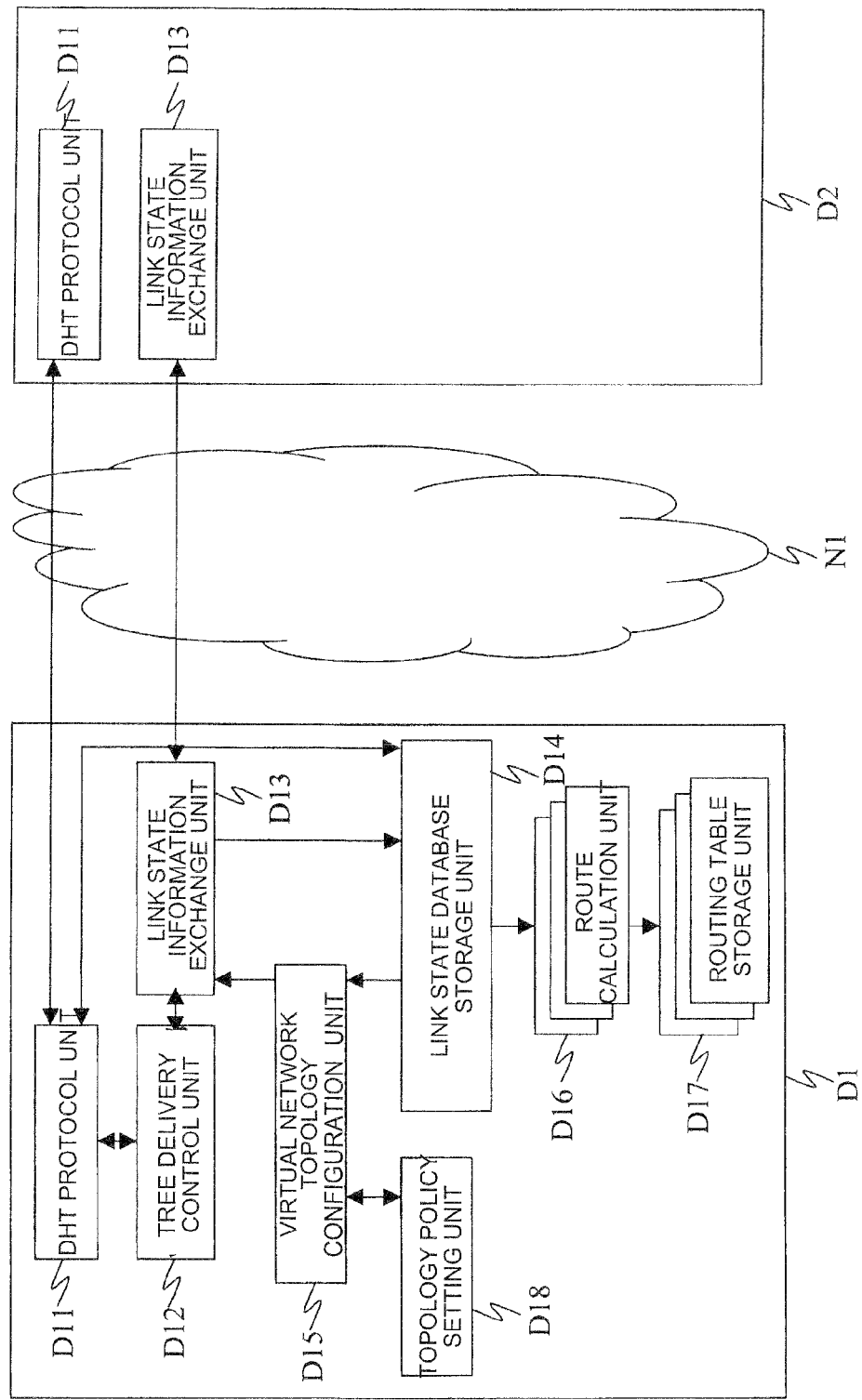
FIG. 14 is a block diagram showing a node in a forth exemplary embodiment of the present invention.

FIG. 14 is a block diagram showing a node in a fourth exemplary embodiment of the present invention. Nodes D1 and D2 in the fourth exemplary embodiment of the present invention shown in FIG. 14 are connected via a base network N1. As in the examples described above, the number of nodes connected via the base network N1 is not limited two. The nodes D1 and D2, which belong to a virtual network, have the same configuration. So, the following describes the configuration of the node D1 as an example of the node configuration.

The node D1 comprises a DHT protocol unit D11, a tree delivery control unit D12, a link state information exchange unit D13, a link state database storage unit D14, a virtual network topology configuration unit D15, route calculation units D16, routing table storage units D17, and a topology policy setting unit D18. Of those components, the DHT protocol unit D11, tree delivery control unit D12, link state information exchange unit D13, and link state database storage unit D14 are components corresponding to the DHT protocol unit C11, tree delivery control unit C12, link state information exchange unit C13, and link state database storage unit C14 in the node C1 in the third exemplary embodiment (see FIG. 10) and, so, their description is omitted.

The virtual network topology configuration unit D15 has the function to automatically configure multiple virtual network topologies based on a list of nodes passed from the link state database storage unit D14 and topology policies stored in the topology policy setting unit D18. In this example, the topology policy setting unit D18 stores topology policies for configuring multiple virtual networks, and the virtual network topology configuration unit D15 sets the neighboring nodes based on the topology policy of each virtual network. The neighboring node setting method for each virtual network is the same method as that described for the topology policy setting unit C18 in FIG. 10.

The route calculation unit D16 uses the link state information on each virtual network, recognized by the link state database storage unit D14, to calculate the next hop or the whole route to reach to the nodes in each virtual network and registers the calculation results in the routing table storage unit D17 as the route entries. That is, the route calculation unit D16 performs route calculation for each virtual network and registers the derived next hop or the whole route in the routing table storage unit D17. The processing performed by the route calculation unit D16 for each virtual network is the same as that performed by the route calculation unit A16 in the first exemplary embodiment. The route calculation unit D16 may also perform route calculation using a route calculation algorithm that differs according to each virtual network.

The routing table storage unit D17 stores a routine table for each virtual network and accepts the registration of route entries for each virtual network calculated by the route calculation unit D16. The routing table provided for each virtual network is the same routing table as that stored in the routing table storage unit A17 in the first exemplary embodiment.

Figure 15:
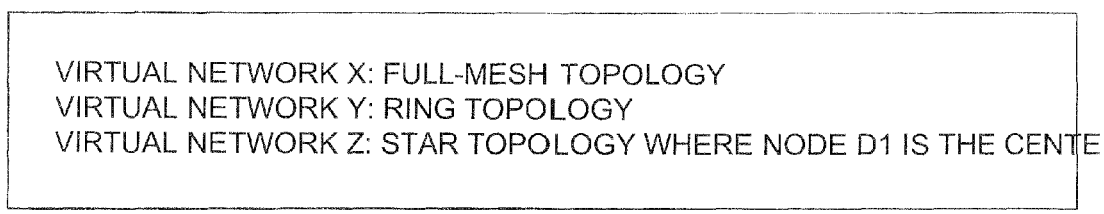
FIG. 15 is a diagram showing an example of topology policies that are set in the forth exemplary embodiment of the present invention.

The topology policy setting unit D18 stores topology policies for configuring multiple virtual networks. FIG. 15 shows an example of topology policies stored in the topology policy setting unit D1. A topology policy used in this example is information for specifying the configuration mode of a virtual network as with a topology policy in the third exemplary embodiment. This exemplary embodiment differs from the third exemplary embodiment in that topology policies are stored, one for each of multiple types of virtual networks. The example in FIG. 15 shows the topology policies corresponding to three virtual networks (virtual networks X, Y, Z). More specifically, the full-mesh topology is set for the virtual network X, the ring topology is set for the virtual network Y, and the star topology is set for the virtual network Z with the node D1 as its central node.

This exemplary embodiment differs from the third exemplary embodiment in that the topology policy setting unit D18 stores topology policies, one for each of multiple virtual networks, and in that the virtual network topology configuration table is set, and route calculation is performed, for each virtual network. This exemplary embodiment is the same as the third exemplary embodiment in other points.

In this exemplary embodiment, the DHT protocol unit D11 also performs up/down monitoring for neighboring nodes in the distributed hash table. This operation is the same as that of the DHT protocol unit A11 in the first exemplary embodiment. When the DHT protocol unit D11 detects the disconnection of a node belonging to one or more of the multiple virtual networks, the tree delivery control unit D12 causes the link state information exchange unit D13 to advertize the link state information individually for each virtual network based on the setting of the neighboring nodes for each of the multiple virtual networks. In response to this link state information, the node sets the virtual network topology configuration table, and performs route calculation, for each virtual network. In this way, the DHT protocol unit D11 performs up/down monitoring, not for each virtual network, but for all virtual networks.

Next, the following describes the effect of this exemplary embodiment. This exemplary embodiment gives the same effect as that of the first exemplary embodiment. In addition, the virtual network topology configuration unit D15 sets the neighboring nodes for each of virtual networks of multiple types according to the topology policies stored in the topology policy setting unit D18, based on the list of the nodes recognized by the link state database storage unit D14. That is, the virtual network topology configuration unit D15 sets the neighboring nodes, one virtual network at a time, and as a result creates a routing table corresponding to each of the multiple virtual networks. This operation allows multiple virtual networks having different topology policies to be automatically configured when a node is added or disconnected.

In configuring multiple virtual networks, up/down monitoring for nodes, if performed by means of the Hello message in each virtual network, would generate the amount of traffic proportional to the number of virtual networks. To avoid this condition, the DHT protocol unit D11 performs up/down monitoring for the entire network in this example. Therefore, the amount of traffic required for up/down monitoring is not proportional to the number of virtual networks but can be kept to a fixed amount.

In the examples described above, the DHT protocol unit, tree delivery control unit, link state information exchange unit, link state database storage unit, virtual network topology policy setting unit, and route calculation unit may be executed by the CPU that operates according to the program route control program. The routing table storage unit and the topology policy setting unit may be the storage devices of the computer.

Figure 16:
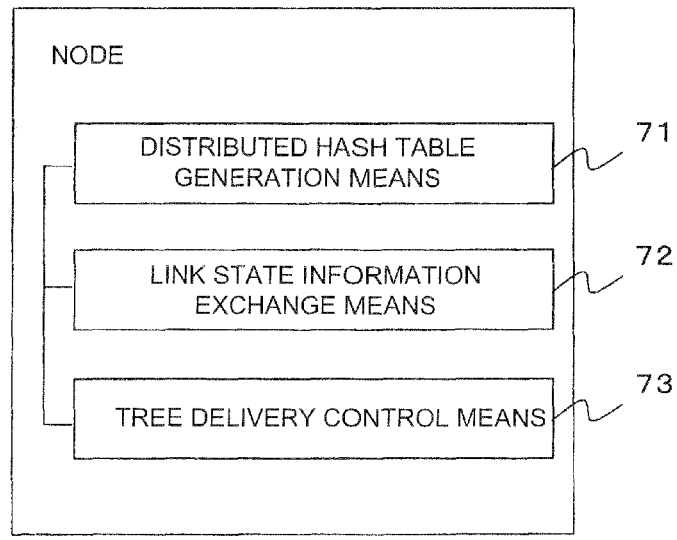
FIG. 16 is a block diagram showing the general configuration of the present invention.

Next, the following generally describes the present invention. FIG. 16 is a block diagram showing the general configuration of the node of the present invention. The node of the present invention belongs to a virtual network on the base network and performs the route control of the virtual network according to a link state routing protocol. As shown in FIG. 16, the node of the present invention comprises distributed hash table generation means 71, link state information exchange means 72, and tree delivery control means 73.

The distributed hash table generation means 71 (for example, implemented by the DHT protocol unit A11) generates a distributed hash table, which indicates a next node to which a message is to he transferred, using a link state routing protocol.

The link state information exchange means 72 (for example, implemented by the link state information exchange unit A13) sends and receives link state information that includes node information on the node itself and link information on links to neighboring nodes.

The tree delivery control means 73 (for example, implemented by the tree delivery control unit A12) determines the transfer destination of the link state information so that the link state information is delivered along a tree where the source node of the link state information is a root. Determining the transfer destination of the link state information in this way minimizes the traffic amount of the link state information.

Preferably, the link state routing protocol is Chord and the tree delivery control means 73 determines the transfer destination of the link state information so that the link state information is transferred along a broadcast tree using Chord Broadcast.

Preferably, the node further comprises up/down monitoring unit (for example, implemented by DHT protocol unit A11) that performs up/down monitoring for a node belonging to the virtual network wherein, when the disconnection of a node belonging to the virtual network is detected, the link state information exchange means 72 sends the link state information indicating the disconnection of the node.

Preferably, the node further comprises node recognition means (for example, implemented by the link state database storage unit A14) that, based on the link state information received by the link state information exchange means 72, recognizes a node that has sent the link state information; and table setting means (for example, implemented by the virtual network topology configuration unit A15) that has, in advance, a table in which neighboring nodes belonging to the virtual network are stored and sets a node, included the neighboring nodes in the table and recognized by the node recognition means, as an alive neighboring node wherein the link state information exchange means 72 sends the link state information including information on the alive neighboring node.

Preferably, the node further comprises topology policy holding means (for example, implemented by the topology policy setting unit B15) that holds a topology policy that is a guideline for the topology of the virtual network; and table setting means (for example, implemented by the virtual network topology setting unit B15) that holds a table in which neighboring nodes belonging to the virtual network are stored and, if node information and link information included in the received link state information do not match the topology policy, updates a setting of the neighboring nodes in the table so that the setting matches the topology policy wherein the link state information exchange means 72 sends the link state information including information on the neighboring nodes stored in the updated table.

Preferably, the node further comprises node recognition means (for example, implemented by the link state database storage unit C14) that, based on the link state information received by the link state information exchange means 72, recognizes a node that belongs to the virtual network; mode specification information holding means (for example, implemented by the topology policy setting unit C18) that holds mode specification information specifying the configuration mode of the virtual network; and table setting means (implemented by the virtual network topology configuration unit C15) that holds a table in which neighboring nodes belonging to the virtual network are stored and, when the node recognition means recognizes a node belonging to the virtual network, modifies the setting of the neighboring nodes in the table so that the configuration mode specified by the mode specification information is satisfied wherein the link state information exchange means 72 sends the link state information that includes information on the neighboring nodes stored in the updated table.

Preferably, the mode specification information holding means (for example, topology policy setting unit C18) holds the mode specification information specifying a full-mesh topology as the configuration mode of the virtual network and the table setting means sets the nodes, recognized by the node recognition means, in the table as the neighboring nodes.

Preferably, the mode specification information holding means (for example, implemented by the topology policy setting unit C18) holds the mode specification information specifying a ring topology as the configuration mode of the virtual network and the table setting means sets a node, which has the smallest node ID among nodes having node IDs larger than the node ID of the node itself, and a node, which has the largest node ID among nodes having node IDs smaller than the node ID of the node itself, in the table as the neighboring nodes.

Preferably, the mode specification information holding means (for example, topology policy setting unit C18) holds the mode specification information specifying a star topology as the configuration mode of the virtual network. If the node itself is a specific node which is a center of the star topology, the table setting means sets each node, recognized by the node recognition means, in the table as the neighboring node and, if the node itself is not the specific node which is a center of the star topology, the table setting means sets the specific node in the table as the neighboring node.

Preferably, the mode specification information holding means (for example, topology policy setting unit C18) holds the mode specification information specifying a tree topology as the configuration mode of the virtual network and, out of the nodes recognized by the node recognition means, the table setting means sets nodes hierarchically higher than, and hierarchically lower than, the node itself in the table as the neighboring nodes.

Preferably, the node further comprises route calculation means (for example, implemented by the route calculation unit D16) that performs route calculation on the virtual network to which the nodes, recognized by the node recognition means, belong wherein the table setting means holds a plurality of tables each corresponding to one of a plurality of virtual networks, the mode specification information holding means holds the mode specification information for each virtual network, the table setting means sets, for each virtual network, a table corresponding to the virtual network according to the mode specification information defined for the virtual network, and the route calculation means performs route calculation for each virtual network.

Preferably, the node further comprises up/down monitoring unit (for example, implemented by the DHT protocol unit D11) that performs up/down monitoring for a node belonging to the virtual network wherein, when the disconnection of a node belonging to the virtual network is detected, the link state information exchange means sends the link state information, which indicates the disconnection of the node, on a virtual network basis.

The present invention is advantageously applicable to a node belonging to a virtual network such as a VPN (Virtual Private Network) or an overlay network.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A node that belongs to a virtual network on a base network and performs routing control of the virtual network according to a link state routing protocol, the node comprising:
   a distributed hash table generation unit that generates a distributed hash table, which indicates a next node to which a message is to be transferred, using the link state routing protocol;
   a link state information exchange unit that sends and receives link state information which includes node information on the node itself and link information on each link to a neighboring node;
   a tree delivery control unit that determines a transfer destination of the link state information so that the link state information is delivered along a tree where a source node of the link state information is a root;
   a node recognition unit that, based on the link state information received by the link state information exchange unit, recognizes a node that belongs to the virtual network;
   a mode specification information holding unit that holds mode specification information specifying a configuration mode of the virtual network; and
   a table setting unit that holds a table in which one or plural neighboring nodes belonging to the virtual network are stored and that, upon the node recognition unit recognizing a node belonging to the virtual network, updates a setting of the one or plural neighboring nodes in the table so that the configuration mode specified by the mode specification information is satisfied,
   wherein the link state information exchange unit sends the link state information that includes information on the one or plural neighboring nodes stored in the updated table.

2. The node according to claim 1, wherein the mode specification information holding unit holds the mode specification information specifying a full-mesh topology as the configuration mode of the virtual network, and
   the table setting unit sets each node, recognized by the node recognition unit, in the table as the neighboring node.

3. The node according to claim 1, wherein the mode specification information holding unit holds the mode specification information specifying a ring topology as the configuration mode of the virtual network, and
   the table setting unit sets a node, which has a smallest node ID among nodes having node IDs larger than the node ID of the node itself, and a node, which has a largest node ID among nodes having node IDs smaller than the node ID of the node itself, in the table as the neighboring node.

4. The node according to claim 1, wherein the mode specification information holding unit holds the mode specification information specifying a star topology as the configuration mode of the virtual network, and
   upon the node itself being a specific node which is a center of the star topology, the table setting unit sets each node, recognized by the node recognition unit, in the table as the neighboring node, and upon the node itself not being the specific node which is a center of the star topology, the table setting unit sets the specific node in the table as the neighboring node.

5. The node according to claim 1, wherein the mode specification information holding unit holds the mode specification information specifying a tree topology as the configuration mode of the virtual network, and
   out of nodes recognized by the node recognition unit, the table setting unit sets a node which is hierarchically higher than the node itself and a node which is hierarchically lower than the node itself, in the table as the neighboring node.

6. The node according to claim 1, further comprising:
   a route calculation unit that performs route calculation on the virtual network to which the node recognized by the node recognition unit, belongs,
   wherein the table setting unit holds a plurality of tables each corresponding to one of a plurality of virtual networks,
   the mode specification information holding unit holds the mode specification information for each virtual network,
   the table setting unit sets, for each virtual network, a table corresponding to the virtual network according to the mode specification information defined for the virtual network, and the route calculation unit performs route calculation for each virtual network.

7. The node according to claim 6, further comprising:
an up/down monitoring unit that performs up/down monitoring for a node belonging to the virtual network,
wherein, upon a disconnection of a node belonging to the virtual network being detected by the up/down monitoring unit, the link state information exchange unit sends the link state information, which indicates the disconnection of the node, on a virtual network basis.

8. A routing control method that is applicable to a virtual network on a base network and that uses a link state routing protocol, the method comprising:
generating a distributed hash table, which indicates a next node to which a message is to be transferred, using a link state routing protocol;
determining a transfer destination of link state information so that the link state information is delivered along a tree where a source node of the link state information is a root; and
sending and receiving the link state information that includes node information on the node itself and link information on each link to a neighboring node;
recognizing a node that belongs to the virtual network, based on the received link state information;
holding mode specification information specifying a configuration mode of the virtual network;
holding a table in which one or plural neighboring nodes belonging to the virtual network are stored;
updating a setting of the one or plural neighboring nodes in the table so that the configuration mode specified by the mode specification information is satisfied, upon a node belonging to the virtual network being recognized; and
sending the link state information that includes information on the one or plural neighboring nodes stored in the updated table.

9. The routing control method according to claim 8, further comprising:
holding the mode specification information specifying a full-mesh topology as the configuration mode of the virtual network is held and
setting the recognized node in the table as the neighboring node.

10. The routing control method according to claim 8, further comprising:
holding the mode specification information specifying a ring topology as the configuration mode of the virtual network; and
setting a node, which has a smallest node ID among nodes having node IDs larger than the node ID of the node itself, and a node, which has a largest node ID among nodes having node IDs smaller than the node ID of the node itself, in the table as the neighboring node.

11. The routing control method according to claim 8, further comprising:
holding the mode specification information specifying a star topology as the configuration mode of the virtual network; and
upon the node itself being a specific node which is a center of the star topology, setting the recognized node in the table as the neighboring node, and upon the node itself not being the specific node which is a center of the star topology, setting the specific node in the table as the neighboring node.

12. The routing control method according to claim 8, further comprising:

holding the mode specification information specifying a tree topology as the configuration mode of the virtual network; and
setting, out of nodes recognize, a node which is hierarchically higher than the node itself, and a node which is hierarchically lower than the node itself in the table as the neighboring node.

13. The routing control method according to claim 8, further comprising:
holding a plurality of tables each corresponding to one of a plurality of virtual networks,
holding the mode specification information for each virtual network,
setting, for each virtual network, a table corresponding to the virtual network, according to the mode specification information defined for the virtual network, and
performing route calculation on a virtual network, to which the recognized node belongs, on a virtual network basis.

14. The routing control method according to claim 13, further comprising:
performing up/down monitoring for a node belonging to the virtual network; and
sending, upon a disconnection of the node belonging to the virtual network being detected, the link state information, which indicates the disconnection of the node, on a virtual network basis.

15. A routing control program installed in a computer that works as a node that belongs to a virtual network on a base network and performs routing control of the virtual network according to a link state routing protocol, the program causing the computer to execute:
distributed hash table generation processing that generates a distributed hash table, which indicates a next node to which a message is to be transferred, using a link state routing protocol;
link state information exchange processing that sends and receives link state information that includes node information on the node itself and link information on each links to a neighboring node; and
tree delivery control processing that determines a transfer destination of the link state information so that the link state information is delivered along a tree where a source node of the link state information is a root, wherein the program is installed in a computer including a mode specification information holding unit that holds mode specification information specifying a configuration mode of the virtual network, the program further causing the computer to execute:
node recognition processing that, based on the link state information received by the link state information exchange processing, recognizes a node that belongs to the virtual network; and
table setting processing that holds a table in which neighboring nodes belonging to the virtual network are stored and that upon the node recognition processing recognizing a node belonging to the virtual network, updates a setting of the one or plural neighboring node in the table so that the configuration mode specified by the mode specification information is satisfied, wherein the program causes the computer to send, in the link state information exchange processing, the link state information that includes information on the one or plural neighboring nodes stored in the updated table.

16. The routing control program according to claim 15, wherein the program is installed in the computer including the mode specification information holding unit holding the mode specification information specifying a full-mesh topology as the configuration mode of the virtual network, wherein the program causes the computer to set, in the table setting processing, the node, recognized by the node recognition processing, in the table as the neighboring node.

17. The routing control program according to claim 15, wherein the program is installed in the computer including the mode specification information holding unit holding the mode specification information specifying a ring topology as the configuration mode of the virtual network, wherein the program causes the computer to set, in the table setting processing, a node, which has a smallest node ID among nodes having node IDs larger than the node ID of the node itself, and a node, which has a largest node ID among nodes having node IDs smaller than the node ID of the node itself, in the table as the neighboring node.

18. The routing control program according to claim 15, wherein the program is installed in the computer including the mode specification information holding unit holding the mode specification information specifying a star topology as the configuration mode of the virtual network, wherein the program causes the computer to set, in the table setting processing, the node, recognized by the node recognition processing, in the table as the neighboring node, upon the node itself being a specific node which is a center of the star topology, and to set the specific node in the table as the neighboring node, upon the node itself not being the specific node which is a center of the star topology.

19. The routing control program according to claim 15, wherein the program is installed in the computer including the mode specification information holding unit holding the mode specification information specifying a tree topology as the configuration mode of the virtual network, wherein the program causes the computer to set, in the table setting processing, out of nodes recognized by the node recognition processing, a node and that is hierarchically higher than the node itself, and a node that is hierarchically lower than the node itself in the table as the neighboring node.

20. The routing control program according to claim 15, wherein the program is installed in the computer including the mode specification information holding unit holding the mode specification information for each virtual network, the program further causing the computer to execute:
route calculation processing that performs route calculation on the virtual network to which the node, recognized by the node recognition processing, belongs, wherein the program causes the computer:
to hold, in the table setting processing, a plurality of tables each corresponding to one of a plurality of virtual networks and to set, for each virtual network, a table corresponding to the virtual network according to the mode specification information defined for the virtual network; and
to perform, in the route calculation processing, route calculation for each virtual network.

21. The routing control program according to claim 20, wherein the program further causes the computer to execute up/down monitoring processing that performs up/down monitoring for a node belonging to the virtual network, wherein, upon a disconnection of a node belonging to the virtual network being detected, the program causes the computer to send, in the link state information exchange processing, the link state information, which indicates the disconnection of the node, on a virtual network basis.

* * * * *